United States Patent
Sun et al.

[11] Patent Number: 6,167,011
[45] Date of Patent: Dec. 26, 2000

[54] PROCESSING OF DISC-DRIVE PICKUP SIGNALS

[75] Inventors: Kai C. K. Sun, deceased, late of Saratoga, by Linda S. L. Sun, executrix; John L. Grimsley, Los Altos, both of Calif.

[73] Assignee: Oak Technology, Inc., Sunnyvale, Calif.

[21] Appl. No.: 09/324,990

[22] Filed: Jun. 2, 1999

Related U.S. Application Data

[63] Continuation of application No. 09/176,698, Oct. 21, 1998, abandoned, and a continuation of application No. 09/058,730, Apr. 10, 1998, abandoned, which is a continuation of application No. 08/917,582, Aug. 22, 1997, Pat. No. 6,041,028

[60] Provisional application No. 06/043,495, Apr. 11, 1997.

[51] Int. Cl.[7] ................................................ G11B 7/09

[52] U.S. Cl. ........................... 369/44.41; 369/44.28; 369/44.29; 369/47

[58] Field of Search ........................ 369/44.27, 44.28, 369/44.29, 44.34, 44.41, 44.25, 47, 48, 58, 59

[56] References Cited

U.S. PATENT DOCUMENTS 5,581,536 12/1996 Klein et al. .................... 369/44.34

*Primary Examiner*—Muhammad Edun
*Attorney, Agent, or Firm*—Townsend and Townsend and Crew LLP

[57] ABSTRACT

Processing of disc-drive pickup signals in a manner that maintains an approximate quadrature relationship. Second order matching filters (353, 303) process pickup signals to remove high frequency components and maintain an approximate quadrature relationship.

7 Claims, 22 Drawing Sheets

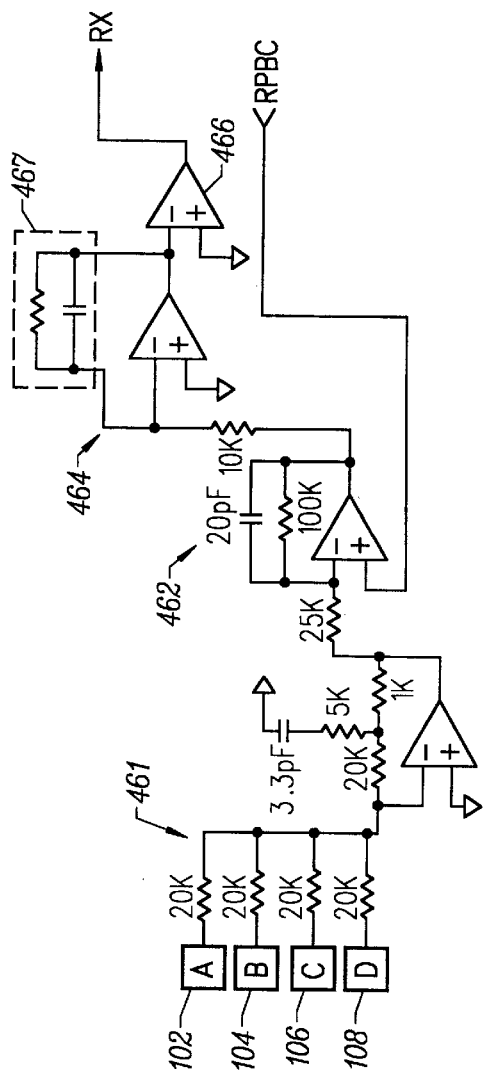
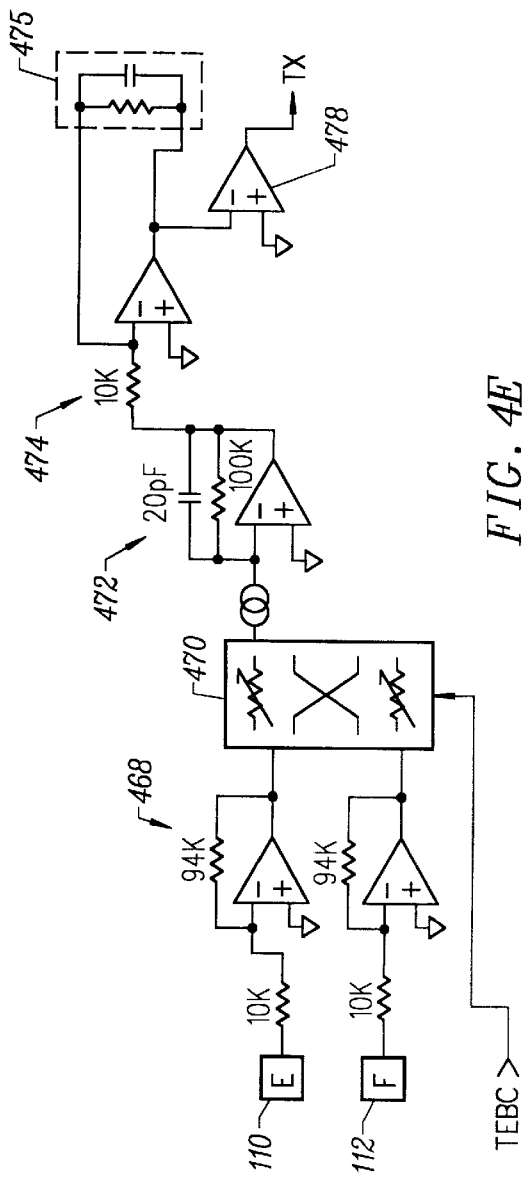
FIG. 4D
FIG. 4E

PROCESSING OF DISC-DRIVE PICKUP SIGNALS

CROSS-REFERENCES TO RELATED APPLICATIONS

This application is a continuation of Ser. No. 09/176,698 filed Oct. 21, 1998, now abandoned and Ser. No. 09/058,730 filed Apr. 10, 1998, now abandoned, which is a continuation of U.S. patent application Ser. No. 08/917,582. This application claims priority from copending U.S. Provisional Application No. 60/043,495, filed Apr. 11, 1997; inventors: Thomas A. Quan and John L. Grimsley), entitled "Proportional Sampling Circuit for Auto-Adjustment of CD-ROM Pickup Signals," and U.S. patent application Ser. No. 08/917,582, filed Aug. 22, 1997, now U.S. Pat. No. 6,041,028; inventors Thomas A. Quan and John L. Grimsley), entitled "Dynamic Adjustment of Disc-Drive Pickup Signals," both of which are hereby incorporated by reference in their entirety for all purposes.

Additionally, copending U.S. patent application Ser. No. 08/834,607, filed Apr. 14, 1997; inventor: John L. Grimsley), entitled "Runout Calibration for Disc Drive System" is hereby incorporated by reference in its entirety for all purposes.

BACKGROUND OF THE INVENTION

The present invention relates generally to the field of disc-drive data storage systems and, in particular, to track search capability within such systems.

The term "disc-drive systems" (or "disk-drive systems") is directed to any system (e.g., optical, magnetic, etc.) that accesses data held on a rotating disc. Optical disc-drive systems include read-only compact discs (CD), digital versatile discs (DVD) and digital videodiscs (DVD), as well as their writable counterparts (e.g., CD-R, CD-RW, DVD-R and DVD-RAM). In such systems, information is read from and/or written to a disc by a transducing head or "pickup" supported adjacent the disc surface. Among the most common of these optical systems is CD-ROM.

CD-ROMs store data in a single, spiral track (analogous to a phonograph record) that circumnavigates the disc thousands of times (e.g., over 20,000) as it gradually moves away from the center of the disc. For ease of discussion, each rotation of this single, spiral track is referred to herein as a track. The architecture and operation of CD-ROM drive systems are well-known by those having ordinary skill in the art, and a description of such systems may be found in C. Sherman, *CD-ROM Handbook,* Intertext Publications McGraw-Hill, Inc. (1994), which is hereby incorporated by reference in its entirety for all purposes.

FIG. 1A shows a simplified block diagram of a typical optical disc-drive system used to reproduce data from a CD-ROM (i.e., a CD-ROM drive system). In optical disc-drive system 10, spindle motor 14 rotates CD-ROM disc 12; optical pickup unit ("OPU") 20 reads data stored on CD-ROM 12 using an optical pickup; feed motor (or "sled motor") 22 changes the radial position of OPU 20; microprocessor controller 40 and a collection of servo and control circuitry (e.g., focusing servo 26, tracking and feed motor servo 24) command disc-drive system 10 to perform the desired operations. CD-DSP 30 is a digital signal processor which descrambles the signal read from CD-ROM 12 by OPU 20 and provides, via CD-ROM controller 39, the digital output data via bus 44 to host computer 50. CD-ROM controller 39 is typically an ATAPI/IDE or SCSI based device, as is well known in the personal computer field.

As noted above, optical disc-drive system 10 reads the data stored on the CD-ROM through OPU 20. OPU 20 translates the optically stored data into electrical signals by shining a laser beam onto CD-ROM disc 12 and detecting the strength of the reflection using photodiodes. The reflected beam contains both data and tracking information. Referring again to system 10, servos 26 and 24 control OPU 20 to keep the laser beam in focus and on track. Finally, CD-DSP 30 demodulates the data signal read from disc 12 and performs the necessary error detection and correction to reproduce and output the stored information.

FIG. 1B illustrates an exemplary arrangement of photodiodes within an optical pickup 100 (disposed in OPU 20) which are used to detect the reflected beam from disc 12. At the center of the arrangement is a four-quadrant photodiode containing diode quadrants or photodiodes 102, 104, 106, and 108, which generate signals A, B, C and D, respectively. A difference in the output current from each quadrant indicates that the laser beam is out of focus on disc 12. A focus error signal is generated by subtracting the signal representing the sum of the currents from diodes 104 and 108 from the signal representing the sum of the currents from diodes 102 and 106. Focusing servo 26 uses the focus error signal (FE) to move an objective lens in OPU 20 in the direction of disc 12 to bring the beam into focus on disc 12. The sum of the output currents from all four quadrants represents the data signal itself. The data signal is coupled to data processing unit 30 where it is reshaped into its original form and delivered to host computer 50.

On either side of photodiodes 102–108 are photodiodes 110 and 112, which generate signals E and F, respectively. These signals are used to ensure the pickup stays correctly on track. The tracks on a CD-ROM disc are tightly spaced, where the track pitch is only 1.6 $\mu$m. Eccentricities in the disc can cause radial swings up to 300 $\mu$m. Thus, maintaining proper tracking of the incident beam is an essential part of the disc drive operation. One commonly used approach is the "three-beam" laser design, in which OPU 20 generates two side beams alongside a main beam. The side beams are used primarily for radial mistracking correction. Photodiodes 110 and 112 are disposed to receive the reflection from these side beams. The intensity of reflection from the sides beams should be equal if the main beam is correctly on track. The difference in the current output from photodiodes 110 and 112 (that is, signal E–F) forms a tracking error signal (TE). The. tracking error signal is used by servo 24 to command a tracking actuator in OPU 20 (not shown) via signal TRO in order to fine tune the radial position of OPU 20, keeping OPU 20 (or, more specifically, the optical pickup) on track. The operation of maintaining the pickup over a desired track is referred to as "track following."

Disc-drive system 10 navigates a CD-ROM disc 12 by searching for a desired track among some 20,000 tracks on the disc. Optical pickup unit 20, besides being moved to correct for tracking errors, is also moved radially across disc 12 to search for a desired track. During a track search, optical pickup 100 (FIG. 1B) as part of OPU 20 moves in a direction shown by arrow 114, which is perpendicular to track orientation arrow 116 (approximating track orientation on an optical disc). The operation of positioning the pickup over a destination or target track by radially moving the pickup across one or more tracks is referred to as a track "search" or "seek." System 10 determines the distance traveled and derives the velocity of track traversal by counting the number of tracks crossed over (i.e., "track crossings"). These crossings are detected by sinusoidal signals generated by photodiodes 102–108 and photodiodes 110, 112. As described below, the resulting signals ("RFRP" and "TE," respectively) oscillate in conjunction with track crossings during a track search.

A conventional track search method includes a coarse search operation combined with a fine search operation. In a coarse search operation, OPU 20 traverses the majority of the distance between the current position and the desired track. Disc-drive system 10 then reads the current track information and calculates the number of remaining tracks to be traversed. System 10 then executes a fine search operation (which may be over hundreds of tracks) where OPU 20 moves inward or outward the appropriate number of tracks remaining. In a conventional disc-drive system, because of inaccuracy in counting track crossings, the fine search operation may be repeated several times before the desired track is finally reached.

FIG. 2A illustrates well-known elements of system 10 used to process track-crossing signals. These elements, identified collectively as preamp/servo circuit 25, may be disposed partly in RF amplifier 19 and partly in tracking and feed motor servo 24 of system 10. Referring to FIG. 2A, the elements of circuit 25, for purposes of discussion, are collectively identified in two separate circuits: preamplifier circuit 118 and servo circuit 120. Inputs to circuit 118 include signals E and F from photodiodes 110 and 112, respectively (FIG. 1B), and signals A, B, C and D from diode quadrants or photodiodes 102, 104, 106 and 108, respectively. Signals E and F are input to difference preamplifier 352 producing signal E–F, which is filtered by low pass filter 124 to produce tracking error signals TE and TEO. Additionally, signals A, B, C and D are input to summing preamplifier 302 producing a data signal referred to as "RF".

When OPU 20 is positioned on a track center, RF is simply a data signal containing high frequency components. However, when OPU 20 is traversing the disc, the summed signal is modulated. The modulation, or envelope, of this summed signal is in quadrature (i.e., 90° out of phase) with the tracking error signal (TE). Utilizing this quadrature relationship, track crossing counts can be qualified and direction of pickup motion can be accurately determined. RF and TE signals are further discussed in connection with FIG. 2B.

Referring again to FIG. 2A, track crossing circuit 122 receives signal E–F (output from preamp 352) for counting the number of track crossings during a rough search operation. This information is forwarded to full track counter 130 for further processing, as is known in the art. As noted above, low-pass filter 124 also receives signal E–F, and forwards a resulting "tracking error" signal (stripped of high frequency components) to comparator 358 (as signal TE) and tracking equalizer 132 (as signal TEO). As is known in the art, TEO may be used to control the radial positioning of OPU 20 to keep the main laser beam on track through the use of tracking equalizer 132 and feed motor equalizer 134. These equalizers generate tracking output ("TRO") and feed motor output ("FMO") signals, respectively, which are selectively applied through switches 154 and 150 under the control of microprocessor controller 40. Additionally, tracking error signal TE is forwarded to comparator 358 where it is compared with a Vref signal and thereby converted to square wave TX. Exemplary TE signal 226 and TX signal 228 are illustrated in FIG. 2B.

Referring again to FIG. 2A, signals A, B, C and D are supplied to summing preamplifier 302. The output of preamplifier 302 contains a high frequency carrier signal which in effect is the data signal. When optical pickup unit 20 is traversing a CD-ROM disc during a search operation, the summed signal is modulated; depicted in FIG. 2B as RF signal 230. The envelope of the modulation 232 approximates a low frequency sinusoidal waveform. When OPU 20 is at track centers, such as at lines 222 and 224, the amplitude of the envelope is the greatest. On the other hand, when OPU 20 is maximally off track boundaries (i.e. exactly between two adjacent tracks), the modulating signal is weakest.

As shown in FIG. 2A, preamplifier 302 is coupled to peak/bottom detector 126. This detector receives the RF signal from preamplifier 302 and processes this signal by repeatedly detecting peak and bottom values of the RF signal and dynamically determining a center value 235. In detector 126, peak detection has slow dynamics while bottom detection has fast dynamics. Utilizing these dynamics, the resulting signal, radio frequency ripple signal ("RFRP") 234 in FIG. 2B, gradually has its center value redefined at the start of a search to approximate the midpoint of the RFRP sinusoidal wave (see, signal portion 233 in FIG. 2B). As shown in FIG. 2B, signal 234 suffers from considerable noise. Returning to FIG. 2A, RFRP is input to comparator 308 where it is compared with a Vref signal and thereby converted to square wave RX. Exemplary RX signal 236 is illustrated in FIG. 2B.

In a conventional track search, pickup 100 crosses tracks of an optical disc by moving along the radius of the disc in the direction of arrow 114 (FIG. 1B). During this process, signals RFRP and TE result in sinewaves approximately 90° out of phase from each other (i.e., quadrature in phase), as shown in FIG. 2B. To facilitate processing, RFRP is thresholded by comparator 308 (FIG. 2A) to produce square wave RX. Similarly, TE is thresholded by comparator 358 to produce square wave TX. The phase of RX in view of TX (i.e., approximately 90° ahead or behind) indicates direction of a search and may be used to qualify counts, as discussed below.

The physical relationship of signal TE 226 with optical disc tracks is shown schematically in FIG. 2B. Referring to this figure, TE 226 crosses a level zero 250 (i.e., $V_{ref}$) at disc track centers 222 and 224. As shown therein, the period "T" of TE 226 represents the crossing of one track width or pitch (e.g., 1.6 $\mu$m). Each crossing of level zero by TE corresponds to a change in state by TX, which is referred to as a half-track pulse 450. Accordingly, starting at point 454 of TE 226 (and not counting the "half-track pulse" created at this point), the generation of two half-track pulses 450 occurring at points 456 and 458 will represent the traversal of a single track on a disc by pickup 100.

RX and TX signals are fed to difference counter 136 which relies upon the quadrature relationship between TX and RX to ensure an accurate count. Difference counter 136 is loaded by controller 40 (FIG. 1A) with target and direction information (e.g., +200 tracks). The value loaded is then counted down using TX-based signals. The TX signals themselves are "qualified" by the RX signals. Specifically, counter 136 may be programmed to monitor for cycles where RX first rises, then TX rises, then RX falls and finally TX falls; i.e., a quadrature relationship where RX precedes TX. If this cycle is satisfied, the count provided by the TX signals is "qualified" and can be relied upon as accurate. However, if this cycle is not detected, the quadrature relationship has been lost and the data can no longer be relied upon.

Returning to FIG. 2A, the output of counter 136 (i.e., half-track pulses, as is well known in the art) is fed to velocity servo 140 to create FMO or TRO control signals. The application of these signals through switches 150 and 154, to feed motor 22 and OPU 20, respectively, is controlled by microprocessor controller 40 as is well known.

A number of deficiencies exist with the prior-art tracking servo of FIG. 2A. Referring to FIG. 2B, RFRP signal 234 generated by detector 126 of FIG. 2A is noisy and prone to inaccuracy. Upon initiating a search, conventional searching start-up noise combined with the inherent noise of RFRP and the process of redefining a center value for RFRP (signal portion 233) results in inaccurate RX signals, as represented by signal portion 237. These inaccurate RX signals, in turn, cause counter 136 to miscount resulting in track search inaccuracy; i.e., the wrong number of track crossings are "counted" during a search creating the need for a subsequent search. Additionally, filter 124 introduces a phase shift in signal TE, which increases with the frequency of this signal. Detector 126 also introduces a phase shift in signal RFRP, but this shift is a different value from that in TE. As the frequency of these signals increases, the difference in phase shifts between these signals also increases until, ultimately, the quadrature relationship is lost causing difference counter 136 to fail. Finally, peak/bottom detector 126 typically fails at signal frequencies exceeding about 40 kHz because it is unable to respond fast enough to signal oscillations at such frequencies. Accordingly, detector 126 creates a frequency ceiling which inherently limits the usefulness of this circuit in high-speed fine searches.

An additional problem facing prior-art systems, such as tracking servo 24, is the gradual degradation of analog signals TE and RFRP during the course of operation. Referring to FIG. 2C, signal 202 represents a sinusoidal signal oscillating with track crossings and derived from the summation of signals from photodiodes 102–108 (i.e., A+B+C+D). Similarly, signal 204 represents a sinusoidal signal oscillating with track crossings and derived from the difference of signals from photodiodes 110 and 112 (i.e., E–F). Like RFRP and TE described above, signals 202 and 204 function as track crossing signals representing the movement of an optical pickup across one or more tracks during a track search.

During a track search, signals A+B+C+D and E–F ideally result in sinusoidal waves 90° out of phase from each other, oscillating about a reference voltage Vref as shown in FIG. 2C. Vref is typically ground or an offset ground in a single power supply system.

Ideally, signals 202 and 204 should have a 50— 50 duty cycle, which contributes to more accurate detection of track crossings. Signals 202 and 204 of FIG. 2A are shown in this ideal state; i.e., they are above level zero 220 for about one half of their period and below this level for the other half (thereby representing a symmetric or 50—50 duty cycle).

However, in practice, this 50—50 duty cycle may not initially be achieved due to an unwanted DC bias on the subject analog signal (i.e., A+B+C+D and/or E–F) which creates an offset from symmetric operation. As is well known, this unwanted bias may be substantially nullified by applying a correction voltage or bias to the subject signal.

Referring to FIG. 3, a sinewave 402 (representing E–F in this example) is subject to an offset 406 from $V_{ref}$. In accordance with conventional methods, this offset is determined by peak detecting the top and bottom of wave 402. Since signals from photodiodes and preamplifiers are noisy, average top and bottom peak values are calculated over a relatively large number of periods (i.e., "T" of FIG. 4) of the subject wave. Typically, the peaks of thirty-two or sixty-four full sinewaves (generated over thirty-two or sixty-four periods, respectively) are measured to obtain the necessary values for calculating the offset. Once calculated, a correction bias 404 is adjusted to produce a new correction bias 404', which compensates for the undesired offset 406. The corrected wave 402' achieves an approximate 50—50 duty cycle about $V_{ref}$.

The foregoing conventional method requires considerable time (i.e., 32 or 64 sinewave periods) to collect the required samples for averaging peak values. As such, this method has an inherent latency that is problematic when performing a track search operation since undesired offsets of A+B+C+D and/or E–F typically undergo rapid change during such searches.

Moreover, the foregoing conventional method is typically applied only once at spin-up calibration (i.e., during power up of a disc-drive system). However, optical pickup signals such as RFRP and TE have been observed to gradually deteriorate during the course of a track search when the pickup is in motion. As such, an initially-applied correction bias may be gradually rendered ineffective over the life of a single search.

Additionally, the conventional method is highly sensitive to sinewaves A+B+C+D and E–F being clipped or similarly distorted since an accurate offset can only be determined from accurate peak values.

Further, the conventional method produces a correction signal that is applied in its entirety at one time. If the offset is large, a comparable correction signal can introduce large transients into the servo loop used for tracking operations which may cause tracking reliability problems.

The foregoing discussion highlights inadequacies in current systems to produce consistently reliable analog signals utilized in monitoring track crossings. Accurate counting of track crossings enhances the positioning control of the optical pickup in OPU 20. Errors in track counts cause OPU 20 to be mispositioned, prolonging the track search time. Furthermore, reliable track crossing counts are needed to optimize the traversal velocity of OPU 20. During the track search operation, the ability to precisely control the acceleration and deceleration of OPU 20 can improve seek time significantly.

Thus, it would be desirable to generate more reliable analog signals utilized in monitoring track crossings to improve the accuracy of track searches performed in optical disc-drive systems.

SUMMARY OF THE INVENTION

The invention provides method and apparatus for generating more reliable analog signals utilized in monitoring track crossings in optical disc-drive systems.

In one embodiment, a disc-drive system with a disc containing a plurality of tracks is provided that includes a first plurality of sensors generating output which is combined to form a first signal oscillating in response to movement across one or more of the plurality of tracks. Also included is a first filter that receives the first signal, such first filter introducing a phase shift to the first signal. Further, a second plurality of sensors is included that generate output which is combined to form a second signal oscillating in response to movement across one or more of the plurality of tracks. Finally, a second filter is included that receives the second signal, such second filter introducing the phase shift to the second signal.

In another embodiment, a disc-drive system with a disc containing a plurality of tracks is provided that includes a first plurality of sensors each generating a first output; a summing circuit, coupled to the first plurality of sensors, for combining the first output of the first plurality of sensors into a first oscillating signal; and a first filter, coupled to the summing circuit, that introduces a phase shift into the first oscillating signal. This system also includes a second plurality of sensors each generating a second output; a difference circuit, coupled to the second plurality of sensors, for combining the second output of the second plurality of sensors into a second oscillating signal; and a second filter, coupled to the difference circuit, that introduces the phase shift into the second oscillating signal.

The foregoing is useful for improving the reliability of disc-drive searches (such as CD-ROMs) over a large number of tracks. For example, conventional CD-ROM drives typically have maximum fine searches of 255 tracks. However, the apparatus described herein has facilitated fine searches of 2047 tracks in CD-ROM drives.

A further understanding of the nature and advantages of the invention may be realized by reference to the remaining portions of the specification and the drawings.

BRIEF DESCRIPTION OF THE DRAWINGS

FIGS. 4D and 4E are circuit diagrams of portions of the block diagram of FIG. 4A.

DETAILED DESCRIPTION OF THE SPECIFIC EMBODIMENTS

Although the Following discussion is directed primarily to CD-ROM drive systems, it would be understood by one having ordinary skill in the art that the invention described herein is applicable to a variety of disc-drive systems including optical or magnetic systems.

Figure 1A:
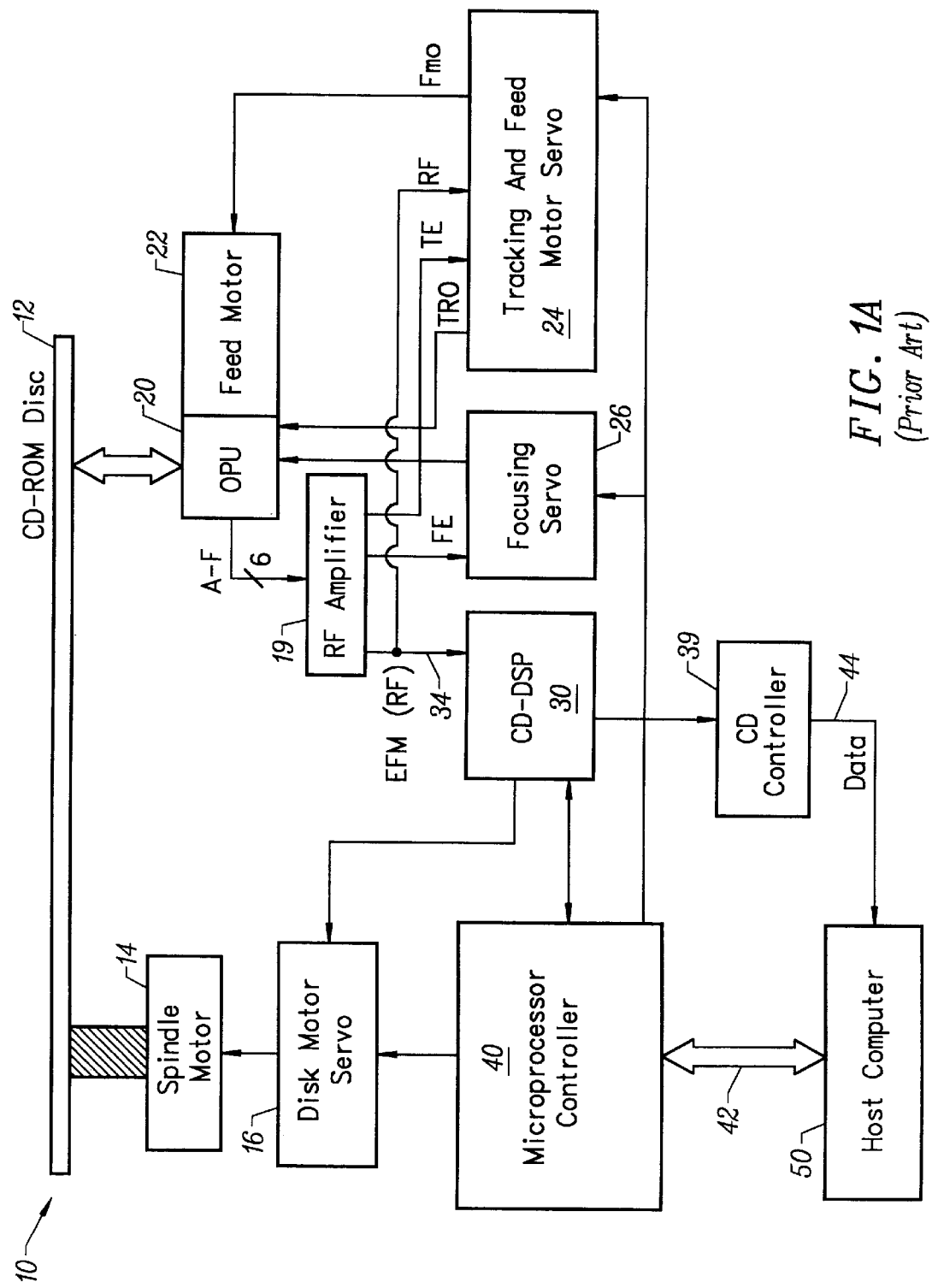
FIG. 1A is a block diagram of a typical optical disc-drive system.
Figure 4A:
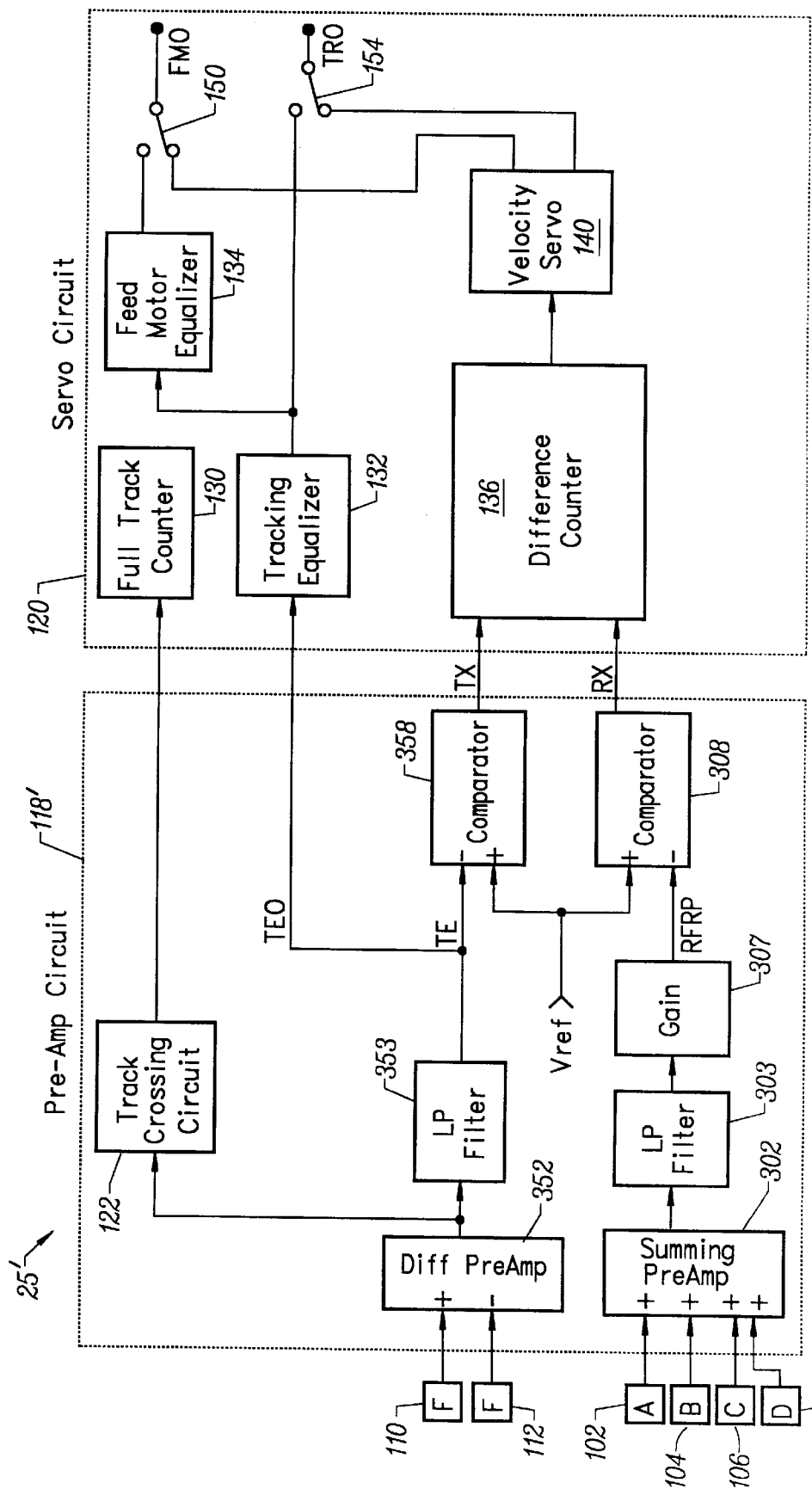
FIG. 4A is a block diagram of a preamp/servo circuit constructed in accordance with one embodiment of the present invention.

FIG. 4A depicts one embodiment of a novel structure constructed in accordance with the teaching of this invention in the form of a modified preamp/servo circuit 25' which receives signals from photodiodes used in a CD drive, for example, in a manner known in the art. Phase matched TX and RX signals are provided in accordance with the teachings of this invention, even at significantly high CD drive speeds; i.e., up to and exceeding 32X speed. For convenience, the embodiment depicted in FIG. 4A is similar in many respects to the prior art structure of FIG. 2A and like labeling and numbering is used for common components. However, it is to be understood that the teachings of this invention are equally applicable with a wide range of circuitries, including those which use techniques other than difference counter 136 in order to keep track of track crossings. In accordance with the invention, the preamp/servo circuit 25' of FIG. 4A may be used in place of prior-art preamp/servo circuit 25 in the system 10 of FIG. 1A.

Figure 4B:
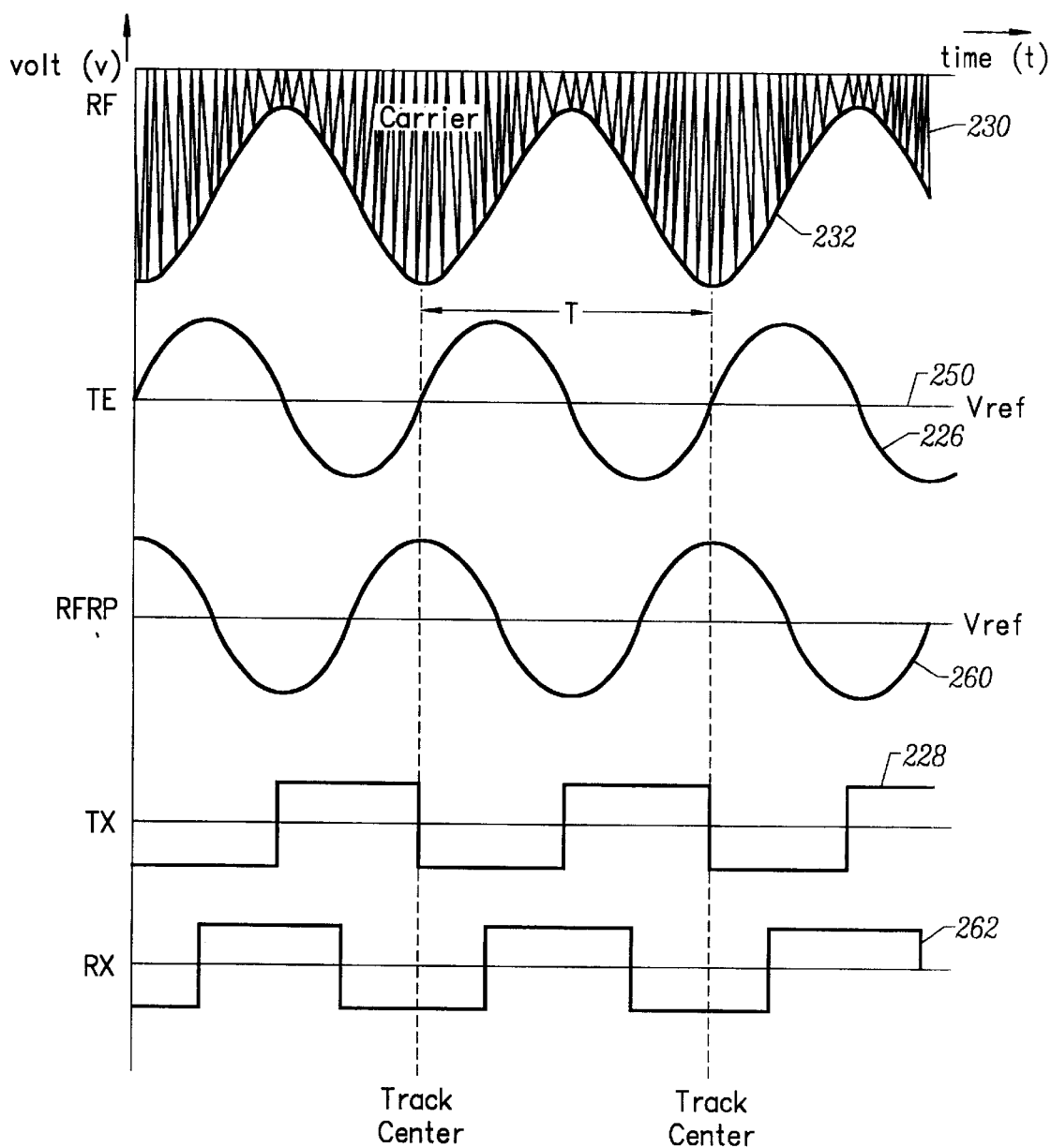
FIG. 4B shows idealized signal waveforms associated with the preamp/servo circuit of FIG. 4A.

In accordance with the present invention, as illustrated in FIG. 4A, the summed signal from photodiodes 102–108 is passed through low-pass filter 303 to strip out its high frequency components and provide a phase shift that is coordinated with the phase shift imposed by filter 353 on signal TE. The result is a low frequency sinusoidal waveform representing, roughly, the average of the envelope 232 of the modulating signal depicted in FIG. 4B. In the embodiment of FIG. 4A, the filtered signal is then inverted by gain circuitry 307, which also adjusts the peak-to-peak amplitude and, if desired, the DC level, of filtered signal to approximate that of the TE signal 226. (Preferably, a fixed gain of four is applied to the output of filter 303.) The resulting signal, denoted radio frequency ripple signal (RFRP), is in quadrature (i.e., approximately 90° out of phase) to the TE signal, as illustrated in FIG. 4B. By virtue of the use of lowpass filter 303, the RFRP quadrature qualifier signal is cleaner than the corresponding RFRP signal used in the prior art, such as RFRP signal 234 of FIG. 2B. Further, the resulting RFRP signal 260 has a matching phase shift to that of signal TE 226; i.e., the signals are "phase-shift matched" thereby preserving their quadrature relationship. This phase-shift matching remains true even at high signal frequencies corresponding to high-speed fine searches (e.g., fine searches exceeding 2000 tracks at TE/RFRP frequencies exceeding 40 kHz). (Signals RFRP 260 and TE 226 of FIG. 4B are shown ideally; i.e., without noise. In actual operation, of course, some noise is present on these signals.)

Figure 2A:
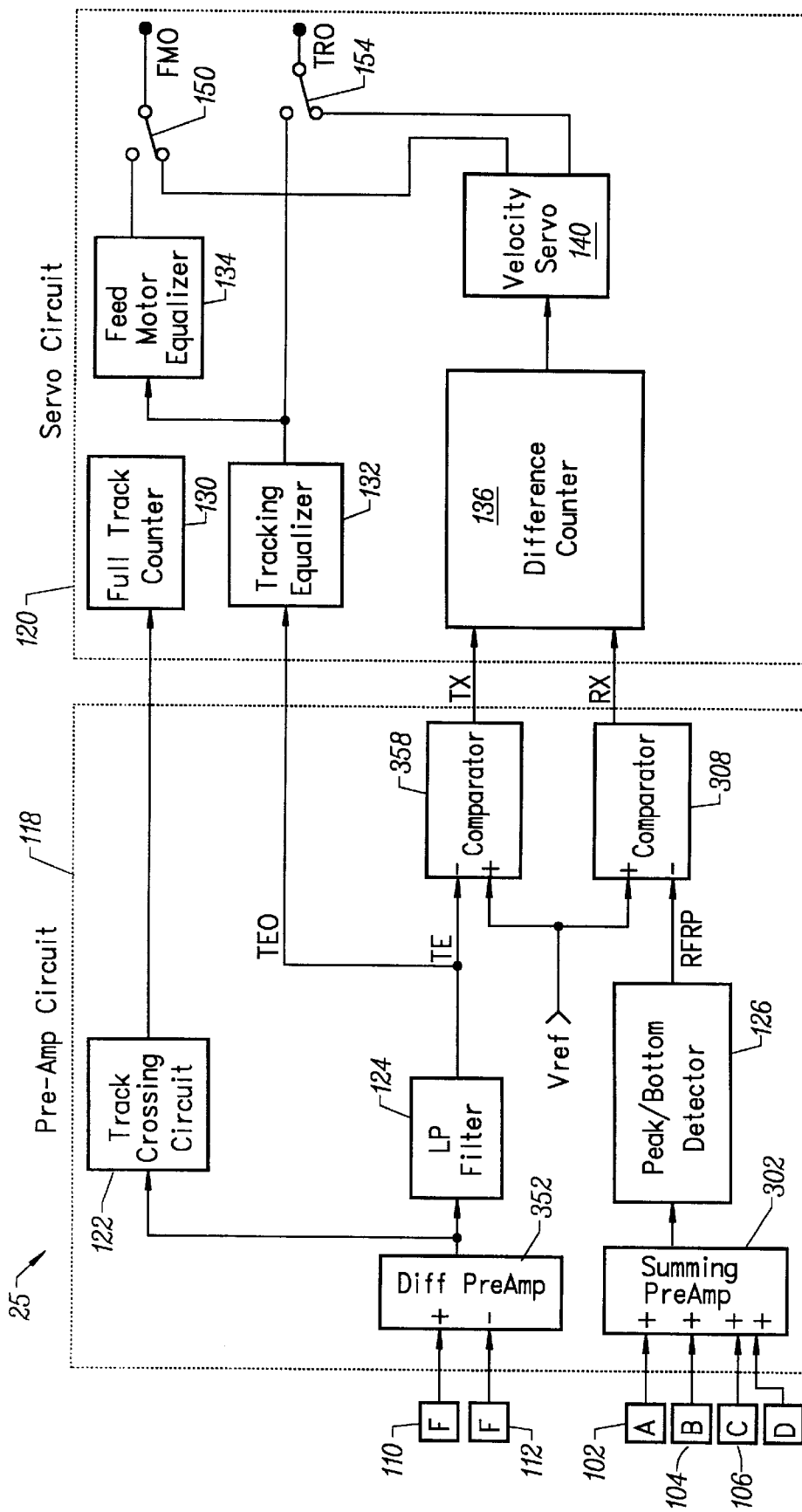
FIG. 2A is a block diagram of a conventional prior-art preamp/servo circuit.
Figure 2B:
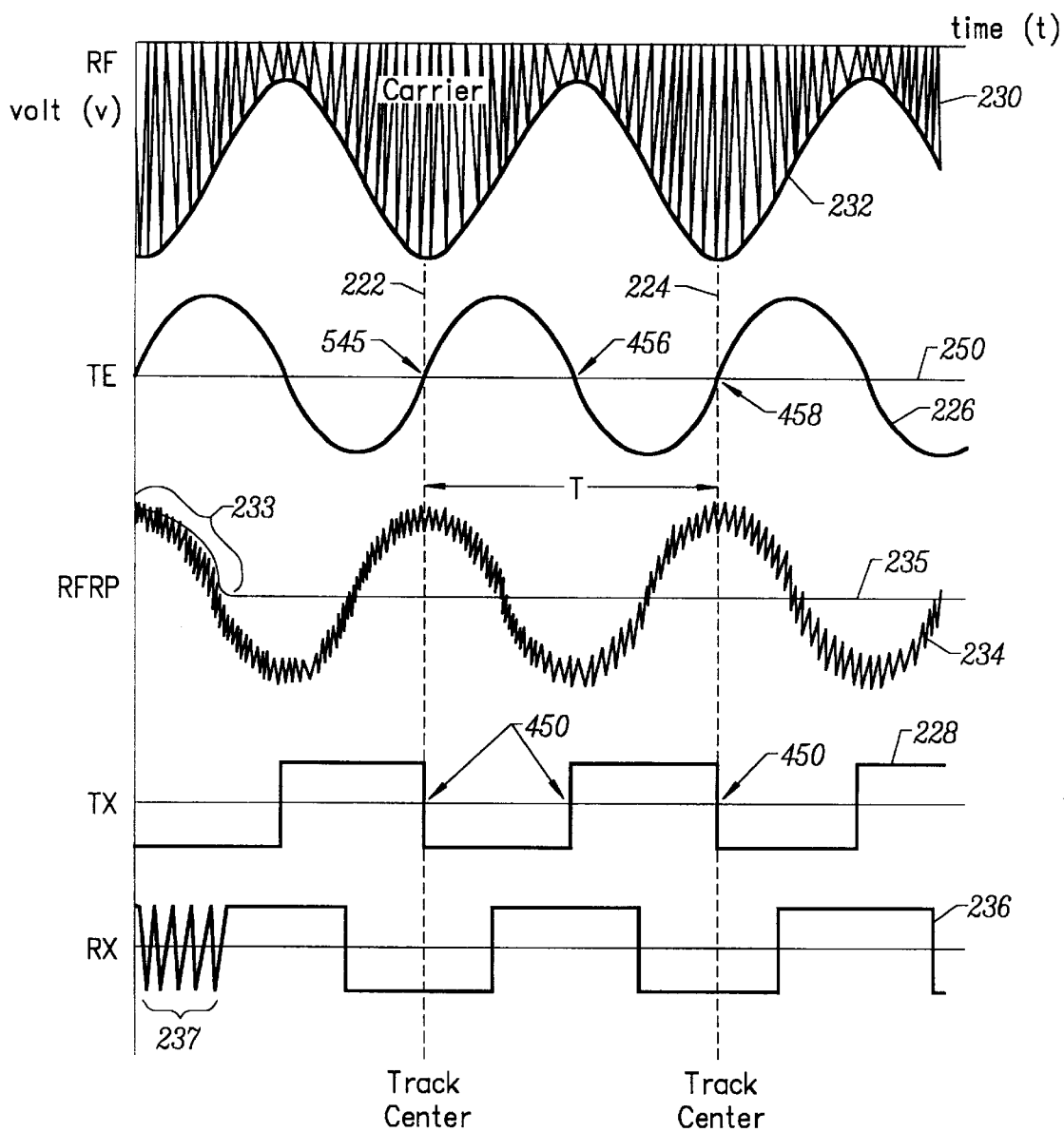
FIG. 2B shows idealized waveforms associated with the circuit of FIG. 2A.
Figure 2C:
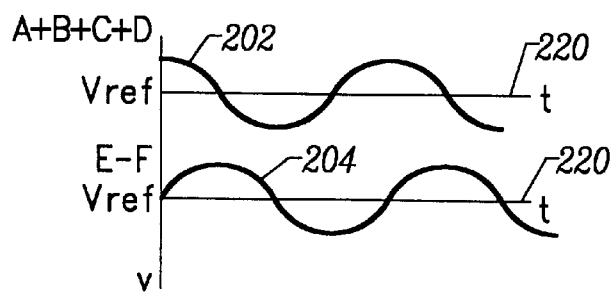
FIG. 2C is a diagram illustrating the relationship between track-crossing signals A+B+C+D and E−F.
Figure 3:
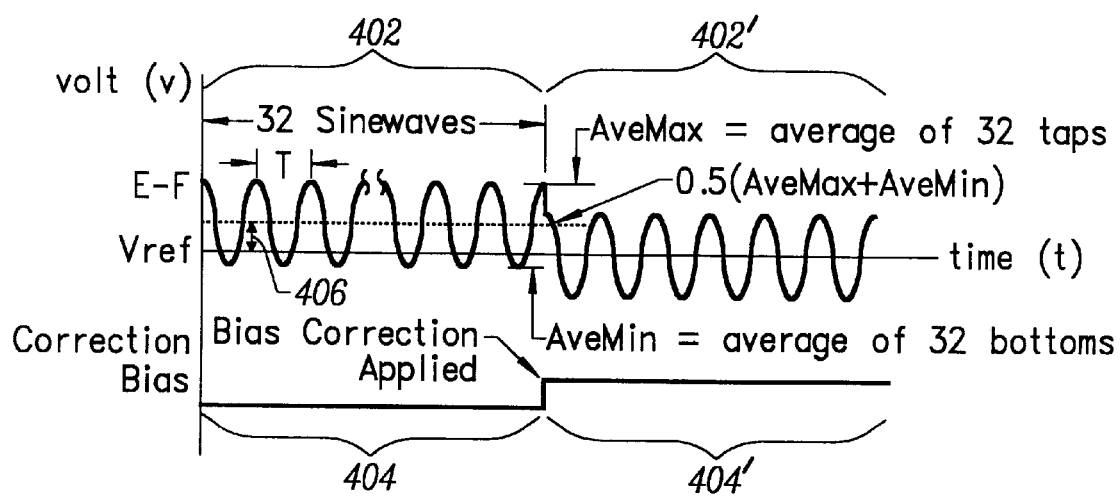
FIG. 3 is a diagram illustrating a prior-art method for adjusting track-crossing signals.

Accordingly, pursuant to this invention, the resulting RX signal from comparator 308 is a relatively clean quadrature signal exhibiting greater reliability than available in the prior-art system of FIG. 2A. This RX signal enables preamp/ servo circuit 25' to provide consistently qualified track crossing counts, thereby improving the accuracy of the search operation. Additionally, preservation of the quadrature relationship ensures that search direction is maintained.

Low-pass filters 303 and 353, in a preferred embodiment, are identical to each other so to maintain an equal phase shift between signals TE and RFRP. Moreover, it is desired that these filters have characteristics that avoid excessive attenuation or phase shifts to the filtered signal at the lowest servo frequency of interest. It is also preferred that these filters provide for proper operation with relatively high-frequency signals, since operating the host optical disc-drive system at a faster speed in an attempt to achieve faster track searches increases the frequency of RFRP and TE.

Conventional CD-ROM Drive systems utilize "run-length limited (2,10)" encoding (also referred to as "EFM" encoding), which prohibits less than two zeros and more than ten zeros from being encoded between two ones on a CD ROM. This means that the operating frequency range of a CD-ROM Drive system utilizing the current standard is from 3T to 11T, where T is the period associated with the channel bit rate associated with the CD-ROM Drive operating speed.

TABLE 1

| Period & Frequency | 1× Speed | 2× Speed | 8× Speed | 16× Speed | 32× Speed |
|---|---|---|---|---|---|
| 11T (ns) | 2545.236 | 1272.618 | 318.1545 | 159.0772 | 79.5386 |
| Min Freq. (Mhz) | 0.196445 | 0.392891 | 1.571564 | 3.143127 | 6.2862 |
| 3T (ns) | 694.1552 | 347.0776 | 86.7694 | 43.3847 | 21.6923 |
| Max Freq. (Mhz) | 0.7203 | 1.4406 | 5.7624 | 11.5248 | 23.0496 |

Referring to Table 1, a 1X speed operation for a conventional CD-ROM Drive system results in a 3T period of about 694 ns and an 11T period of about 2545 ns. For a 2X CD operation, these numbers are halved, and so on. As noted above, it is desired to select the characteristics of low-pass filters 303 and 353 such that the lowest frequency of the operation is considered. Thus, for a 1X speed, the minimum frequency associated with the maximum period of 11T is approximately 196 kHz.

Accordingly, in one embodiment low-pass filters 303 and 353 are second order filters having cut-off frequencies of approximately 60 kHz, which provide approximately 20 dB attenuation at 196 kHz (i.e., the lowest signal frequency of interest in the system of Table 1). Such filter-characteristic will inherently provide greater attenuation of the frequencies associated with higher speed CD operation. This ability to operate at higher frequencies is a distinct advantage over prior art systems utilizing peak/bottom detectors, which typically fail at frequencies exceeding 40 kHz.

In an alternative embodiment, low-pass filters 303 and 353 may have a cut-off frequency of approximately 100 kHz (or higher), allowing faster seek times. In this embodiment, the operating speed of the host CD-ROM Drive system should be operating at a higher disc speed (e.g., 2X or higher in the system of Table 1).

Figure 4C:
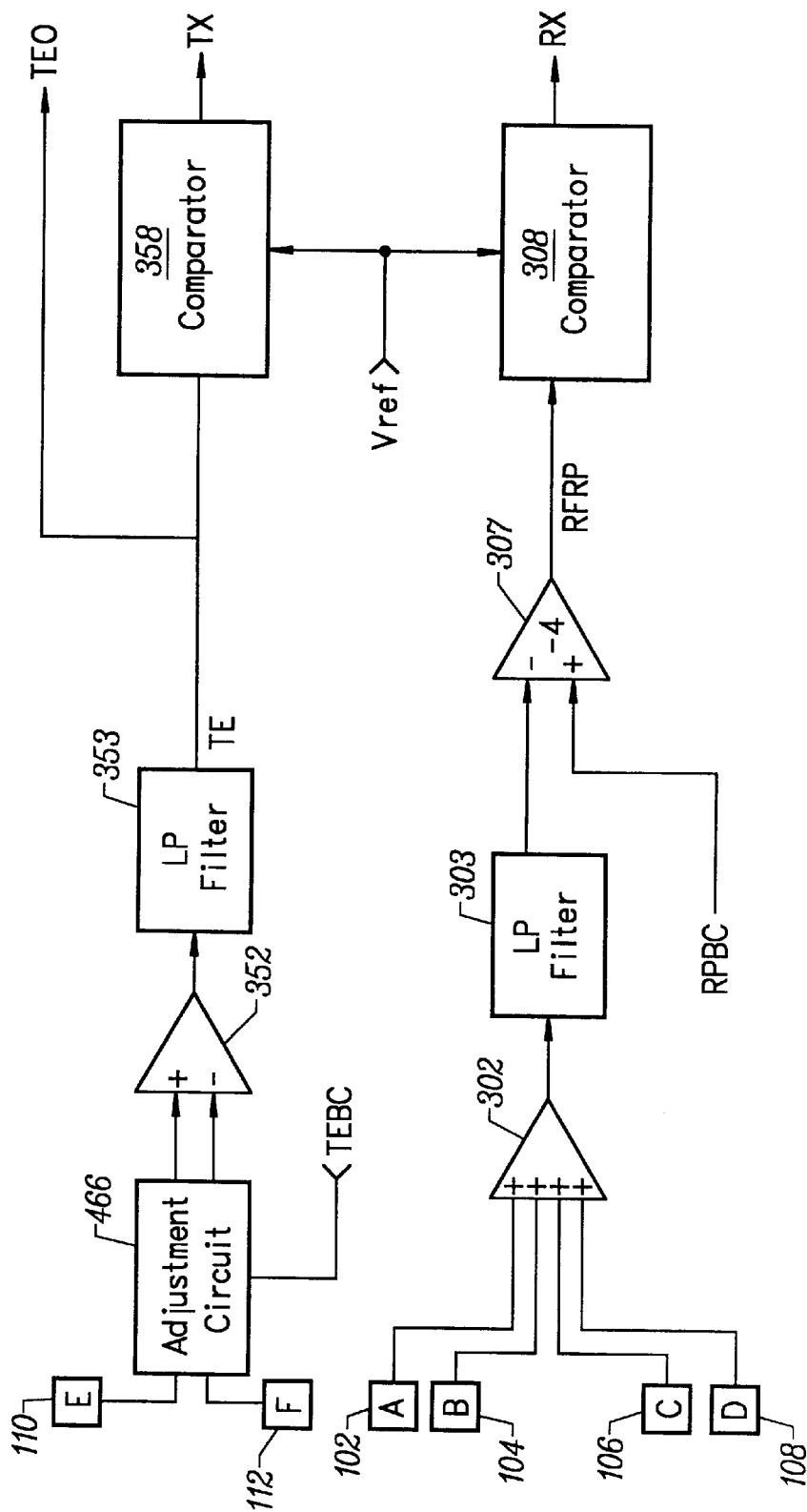
FIG. 4C is a circuit diagram or one embodiment of the present invention showing the use of TEBC and RPBC signals.

FIG. 4C illustrates one embodiment of low pass filter 303 and gain and level shift circuitry 307 suitable for generating the RFRP signal. In this embodiment, difference signal E–F (generated by difference preamplifier 352) passes through low-pass filter 353, and the resulting filtered signal is supplied to comparator 358. Adjustment circuit 466 receives the E and F signals and a tracking error balance correction (TEBC) signal (as is known in the art) to adjust the E and F signals such that they are better matched in the event the diodes used to generate the E and F signals are not well balanced. The resulting balanced E and F signals are applied to difference preamplifier 352. Comparator 358, as described above, generates the TX signal by comparing the filtered TE signal with a reference voltage Vref.

Concurrently, an RF signal (created from the sum of signals A, B, C and D) generated by preamplifier 302 passes through low pass filter 303 to produce a low-frequency sinusoidal waveform as described above. This resulting waveform is connected to the inverting input terminal of differential preamplifier 307, which inverts the signal and applies a gain of four. Ripple balance control signal RPBC is applied to the non-inverting input terminal of preamplifier 307 which centers the RFRP signal prior to its application to comparator 308. The RFRP signal thus generated is supplied to comparator 308, where the RFRP signal is compared with a reference voltage Vref to generate the digitized RX signal. The TX signal and the quadrature RX signal are then applied to servo circuit 120 as shown in FIG. 4A to monitor track crossings using, for example, a difference counting technique, as is known in the art.

A circuit embodiment of low-pass filters 303, 353 and supporting circuitry is provided in FIGS. 4D and 4E. These figures illustrate the second-order filters described above as two first order filters.

Referring to FIG. 4D, signals A–D generated by photodiodes 102–108, respectively, are initially summed at node 461 and processed by equalizer circuit 460. The resulting signal is passed to preamplifier circuit 462, which functions as a first order filter having a fixed cut-off frequency of approximately 80 kHz. Circuit 462 also applies a fixed gain of four to the signal and inputs RPBC to center the resulting RFRP signal about $V_{ref}$ (i.e., about 2.1 volts for the circuits shown in FIGS. 4D and 4E).

Preamplifier circuit 464, coupled to circuit 462, also functions as a first order filter with variable gain and cut-off frequency. Specifically, the resistor and capacitor disposed in box 467 are set by the user (i.e., external to the semiconductor chip on which circuits 460 and 462, for example, reside). The gain is used to control, for example, peak-to-peak values to ensure compatibility with system hardware and similarity with TX characteristics. The cut-off frequency is dependent upon CD-ROM drive operating speeds. For example, in 1X devices, a cut-off frequency of approximately 40 kHz may be used. Alternatively, for 32X devices, a cut-off frequency of approximately 106 kHz may be selected. Referring to FIG. 4A, filter 303 is embodied in preamplifier circuits 462 and 464 of FIG. 4D.

Finally, comparator circuit 466, coupled to preamplifier circuit 464, compares the output of circuit 464 to $V_{ref}$ to generate signal RX.

Referring to FIG. 4E, signals E and F generated by photodiodes 110 and 112, respectively, pass through gain amplifiers 468 and are processed in adjustment block 470 (representing conventional circuitry). This block receives signal TEBC to vary the gain of signals E and/or F to match differences in diodes 110 and 112. This block also generates the difference signal (i.e., E–F) which is passed to preamplifier circuit 472. Circuit 472 functions as a first order filter having a fixed cut-off frequency of approximately 80 kHz.

Preamplifier circuit 474, coupled to circuit 472, also functions as a first order filter with variable gain and cut-off frequency. Circuit 474 has the same options for configuration and operation as described above for circuit 464. In this case, the resistor and capacitor in box 475 (which are external to the semiconductor chip in which circuits 468–472, for example, reside) are freely adjustable by the user. In a preferred configuration, circuits 464 and 474 have approximately identical cut-off frequencies and produce signals having approximately identical peak-to-peak characteristics. Referring to FIG. 4A, filter 353 is embodied in preamplifier circuits 472 and 474.

Finally, comparator circuit 478, coupled to preamplifer circuit 474, compares the output of circuit 474 to $V_{ref}$ to generate signal TX.

Figure 1B:
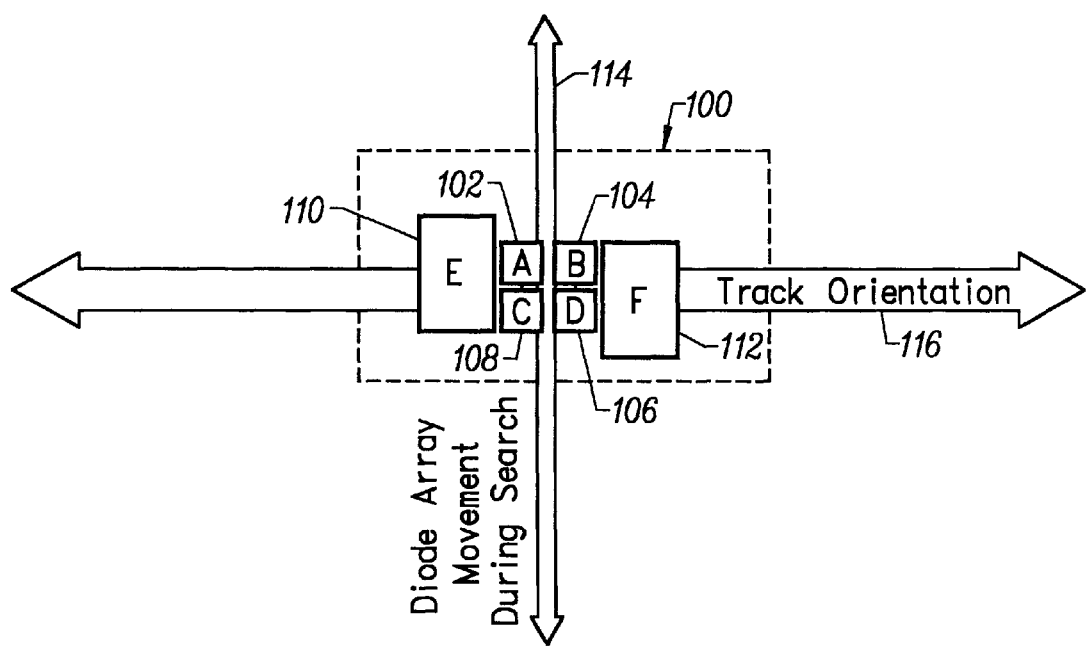
FIG. 1B is a layout diagram of photodiodes within a conventional optical pickup.
Figure 5:
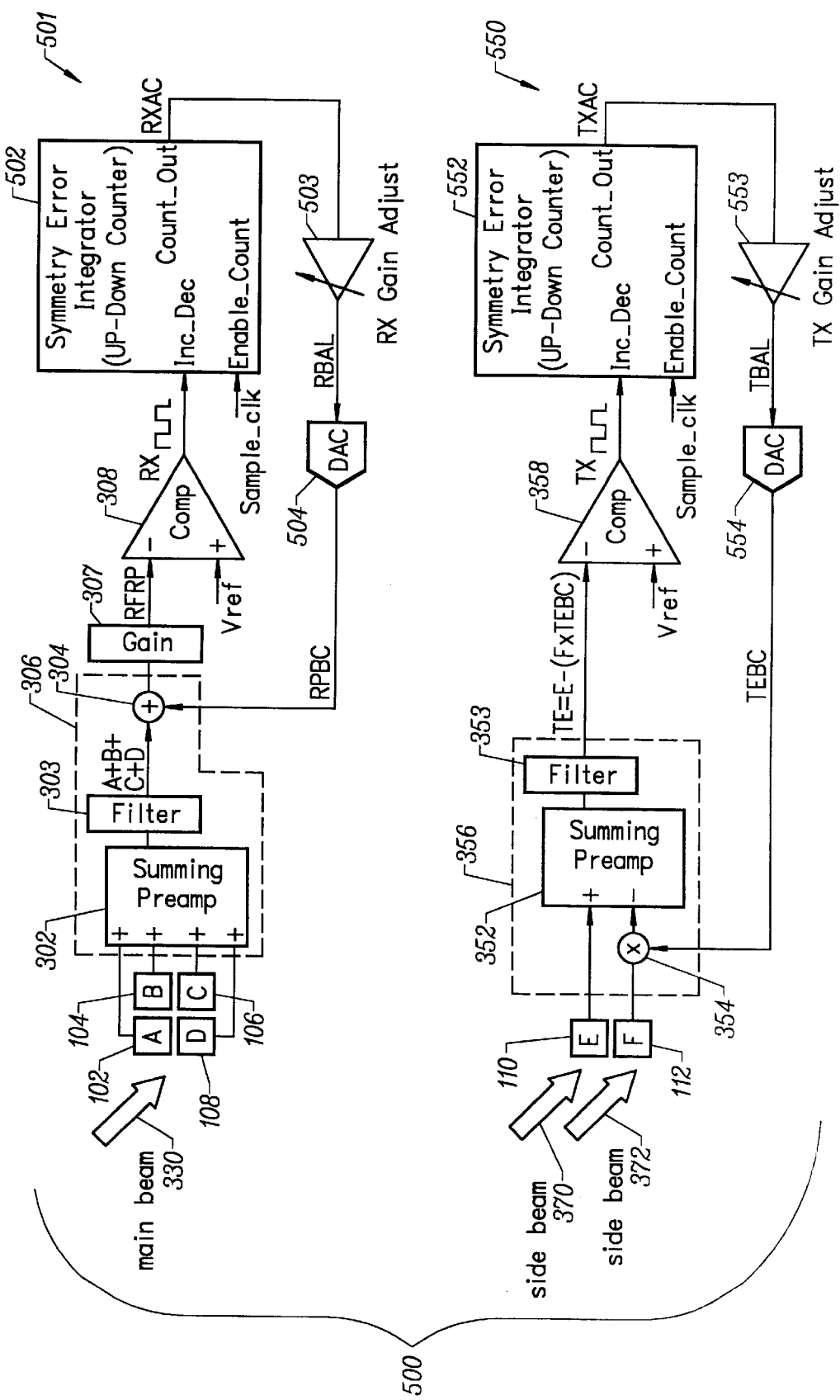
FIG. 5 is a block diagram of system architecture for dynamically adjusting disc-drive pickup signals in accordance with the invention.

FIG. 5 illustrates additional modifications to preamp/servo circuit 25' of FIG. 4A according to the invention in the form of system 500. Portions of circuit 25' previously shown in FIG. 4A are repeated in FIG. 5 for clarity. System 500, as shown in FIG. 5, includes component systems 501 and 550 which process signals from photodiodes 102–108 and 110–112, respectively. As noted above, these photodiodes are configured within an optical pickup, such as pickup 100 of FIG. 1B, and used to "read" an optical disc in accordance with the "three-beam" laser operation described above.

More specifically, system 501 contains photodiodes 102–108 coupled to a signal processing circuit 306 which is, in turn, coupled to comparator 308 through gain circuitry 307. Circuit 306 includes summing preamplifier 302, low-pass filter 303 (for removing high-frequency data modulation components and matching the phase shift introduced by filter 353, as described above) and a summing junction 304. As described above, preamplifier 302 sums the signals generated by photodiodes 102–108. The resulting summation (i.e., signal A+B+C+D) passes through filter 303 and is received by summing junction 304.

A second input to junction 304 is a correction bias (e.g., Ripple Balance Correction or RPBC) generated by a digital-to-analog converter (DAC) 504. In accordance with the invention, signal RPBC is applied to junction 304 to adjust for any unwanted offset that may be present in filtered signal A+B+C+D. The output of junction 304 passes through gain circuitry 307, which may be used to adjust the peak-to-peak amplitude and, if desired, the DC level of this signal to approximate that of signal TE.

The output of gain circuitry 307 is RFRP. As described above, during operation of the host CD-ROM drive system where diodes 102–108 move laterally over an optical disc in performing a track "search," RFRP will oscillate in conjunction with track crossings. Referring again to FIG. 5, RFRP is forwarded to comparator 308 where it is compared with a reference voltage $V_{ref}$ (typically ground or an offset ground in a single power supply system). The output of comparator 308 is square wave RX.

This system also includes a Symmetry Error Integrator 502 coupled to the output of comparator 308. Integrator 502 is further coupled to RX Gain Adjust 503 which is, in turn, coupled to Digital to Analog Convertor (DAC) 504. As noted above, the output of DAC 504 is fed into junction 304 thereby creating a feedback loop. In a preferred embodiment, integrator 502 is an up-down counter.

System 550 contains photodiodes 110, 112 coupled to a signal processing circuit 356 which is, in turn, coupled to comparator 358. Circuit 356 includes a multiplying junction 354, difference preamplifier 352 and low-pass filter 353 (for removing a high-frequency data modulation component and matching the phase shift introduced by filter 303, as described above). Circuit 356 may be configured in any conventional design well-known to those having ordinary skill in the art. The output of circuit 356 is an analog signal TE. As described above (like RFRP), during a track search by the host CD-ROM drive system, TE will oscillate in conjunction with track crossings. Accordingly, as Previously discussed, both RFRP and TE function as track-crossing signals representing pickup movement across one or more tracks during track searches.

Inputs to multiplying junction 354 are coupled to a DAC 554 and photodiode 112, and an output to this junction is coupled to preamplifier 352. Junction 354 modifies signal "F" with a correction bias (e.g., Tracking Error Balance Correction or TEBC) from DAC 554 that adjusts for any unwanted offset in TE. Modified signal F and the output from photodiode 110 (i.e., signal "E") are subtracted from each other in preamplifier 352. The resulting difference signal (i.e., E–(F×TEBC)) passes through filter 353 and is received by comparator 358. Using a reference voltage $V_{ref}$ (typically ground or an offset ground in a single power supply system), comparator 358 converts the signal output from filter 353 to square wave TX.

System 550 also includes a Symmetry Error Integrator 552 coupled to comparator 358. Integrator 552 is further coupled to TX Gain Adjust 553 which is, in turn, coupled to DAC 554. The output of DAC 554 is fed into Junction 354 thereby creating a feedback loop. In a preferred embodiment, integrator 552 is an up-down counter.

As described above, system 500 is disposed within a host CD-ROM Drive system using conventional three-beam operation and configured with a pickup, such as pickup 100, containing photodiodes 102–112 (FIG. 1). Referring to FIG. 5, photodiodes 102–108 receive main beam 330 and photodiodes 110 and 112 receive side beams 370 and 372, respectively, in accordance with conventional three-beam operation. As described above, diodes 102–108 and 110–112 generate signals that are processed to become RFRP and TE, respectively. As also noted above, these signals oscillate in conjunction with track crossings during a track search and therefore function as track-crossing signals representing pickup movement across one or more tracks.

Ideally, both digital signals RX and TX should have a 50—50 duty cycle. This contributes to, among other things, more accurate detection of track crossings and a greater likelihood that a quadrature phase relationship between RX and TX can be maintained. Such overlapping relationship is used to qualify track crossings, as described above, and determine direction of a track search, as discussed below. Signals 260 and 226 of FIG. 4B are shown in this ideal state; i.e., they are above $V_{ref}$ for about one half of their period and below this level for the other half (thereby representing a symmetric or 50—50 duty cycle).

In practice, this 50—50 duty cycle may not initially be achieved due to an unwanted DC bias on the subject analog signal (i.e., RFRP and/or TE) which creates an offset from symmetric operations. In accordance with system 500 of FIG. 5, such unwanted bias may be substantially nullified by applying a correction bias (i.e., RPBC and/or TEBC) to the subject signal.

In system 500, RPBC voltage may be positive or negative depending upon whether an unwanted bias lowers or raises the subject signal below or above a fixed reference voltage (e.g., $V_{ref}$) and thereby creates a nonsymmetric duty cycle. Alternatively, signal TEBC may be less than one or greater than one (i.e., typically forming a range of about 0.5 to about 2.0) depending upon whether an unwanted bias lowers or raises the subject signal below or above a fixed reference voltage (e.g., $V_{ref}$) and thereby creates a nonsymmetric duty cycle.

Systems 501 and 550 dynamically generate correction bias for each individual RFRP and TE sinewave based upon the duty cycle of RX and TX, respectively. These systems use Symmetry Error Intearators 502 and 552 to integrate symmetry error present in the RX and TX duty cycles, respectively. Such integration is applied to junction 304 via DAC 504 as a closed-loop correction bias. Similarly, such integration is applied to junction 354 via DAC 554 as a closed-loop correction bias. Each full RX or TX squarewave is sampled at a sampling frequency (via "Sample_clk") much higher than its fundamental frequency, thus providing enough resolution to generate a correction bias signal when symmetry is off. In one embodiment, the sampling frequency may be fixed (e.g., at about 352.8 kHz). More preferably, as described below, the sampling frequency may be variable (e.g., ranging from about 22 kHz to about 2.8 MHz). RX and TX frequencies are typically much lower; e.g., from about 1 kHz to about 120 kHz.

In operation, integrators 502 and 552 will count up when RX and TX, respectively, are sampled high. Conversely, these integrators will count down when RX and TX are sampled low. Accordingly, signals RX and TX function as control signals directing the operation of integrators 502 and 552, respectively. The outputs of integrators 502, 552 are continuously adjusted as described below.

An asymmetrical squarewave will have an uneven distribution of high and low periods. As such, integrators 502 and 552 will produce a net positive or negative count for each square wave period. On the other hand, a symmetrical wave will have an even distribution of high and low portions over a single period "T". As such, integrators 502 and 552 will produce a count at the end of a period that remains unchanged from a previous count of the immediately previous period.

Figure 6A:
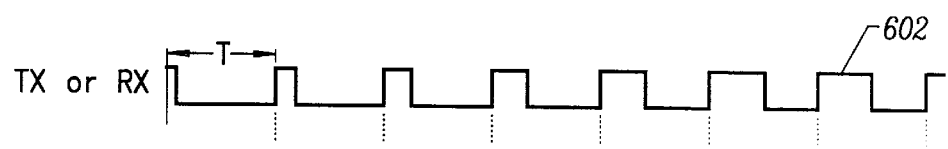
FIGS. 6A–6C graphically illustrate an asymmetric waveform becoming symmetric in accordance with the present invention.
Figure 6B:
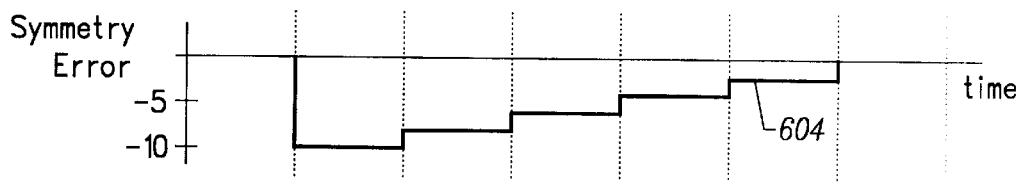
Figure 6C:
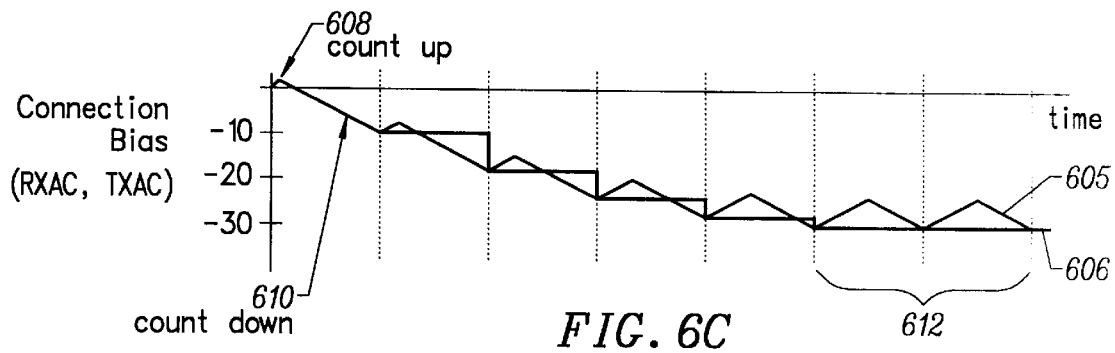

FIGS. 6A–6C graphically illustrate an asymmetric waveform 602 (TX or RX) becoming symmetric in accordance with the present invention. FIG. 6A shows the transformation of waveform 602 from asymmetric to symmetric proportions, FIG. 6B shows the symmetry error 604 of waveform 602 and FIG. 6C shows the correction bias generated by integrators (e.g., 502 or 552 of FIG. 5) to eliminate symmetry error 604. The correction bias of FIG. 6C is shown in two forms: continuously-adjusted output 605 superimposed over periodically-adjusted output 606. Each correction bias form, as described below, is dependent upon the count of integrators such as integrators 502 or 552.

When waveform 602 is high, an integrator (e.g., 502 or 552) counts up (e.g., 608) and when waveform 602 is low, the integrator counts down (e.g., 610). As the square wave 602 becomes more symmetric, the symmetry error 604 (FIG. 6B) decreases and the correction bias voltage, created by integrating the error, gradually levels off for each period T. The net change in the integrator for each period T becomes zero when the duty cycle of waveform 602 reaches 50% (i.e., region 612). Noisy signals are assumed to have as many false highs as false lows, so the average should be approximately zero. As such, this processing is relatively insensitive to any crossing noise of the analog signal from which waveform 602 is derived.

Referring to FIG. 5, digital correction bias signals RXAC and TXAC generated from integrators 502 and 552, respectively, are maintained to correct for any offset that is present in signals RFRP or TE. Adjustment of these signals may be either continuous or periodic. Continuous adjustment of signals RXAC and TXAC simply requires the immediate output of count values from integrators 502, 552 as they are generated. This results in an output with relatively continuous rises 608 and falls 610, as shown in line 605 of FIG. 6C. Alternatively, signals RXAC and TXAC may be periodically adjusted by delaying and triggering changes to RXAC and TXAC with transitions in signals RX and TX, respectively. This results in an output potentially having relatively discontinuous changes, as shown in line 606 of FIG. 6C.

As graphically illustrated by line 606, periodic adjustment applies the net result of a count for a given period to RXAC or TXAC at the end of the period. Referring to FIG. 5, such periodic operation would require additional logic coupled to the outputs of integrators 502, 552 to sum and hold the counts for each period. This logic is straight forward and need not be further described. Preferably, however, such logic is not used and the outputs of integrators 502, 552 are directly applied when generated (i.e., continuously adjusted) as correction bias in accordance with the embodiments of FIGS. 5 and 10.

Continuous adjustment is beneficial since it provides for changes to correction bias even when there is no RX or TX transition. This is particularly beneficial in the situation where RX or TX are grossly out of balance to the point where no transition is detected. Using periodic adjustment under such conditions, no modification to correction bias would occur and the loop would simply remain in its current condition. However, with continuous adjustment, there is at least the possibility that the gross offset experienced by RX or TX may be gradually corrected if the correction bias is moving in the proper direction. Any noise perceived to be added to the correction bias through the use of continuous adjustment (i.e., in the form of a triangle ramping up and down during each period T) appears to be insignificant and makes no practical difference in the final outcome.

Referring again to FIG. 5, RX Gain Adjust 503 and TX Gain Adjust 553 provide gain adjustment to RXAC and TXAC, respectively. In operation, Gain Adjust 503, 553 provide a coefficient that is multiplied with RXAC and TXAC, respectively, to control the variation of DAC 504, 554 output in response to each count generated by integrators 502, 552. The purpose of these gain adjusts are simply to prevent the corresponding DACs in systems 501 and 550 from being too sluggish (i.e., the change in DAC output is disproportionately small for each count) or too sensitive (i.e., the change in DAC output is disproportionately large for each count). As would be understood by one having ordinary skill in the art, the necessary coefficients for Gain Adjusts 503, 553 are design-specific and controlled at least in part by the characteristics of the individual components that make up systems 501 and 550.

In accordance with the embodiment of FIGS. 5 and 6, a 50-50 duty cycle is dynamically maintained for pickup signals in real time. This operation is relatively insensitive to the pickup sinewaves being clipped or similarly distorted since control is based upon duty cycle rather than peak values. Further, as illustrated in FIG. 6, correction bias is applied incrementally and is therefore less likely to introduce large transients into the servo loop used for tracking operations.

Figure 7:
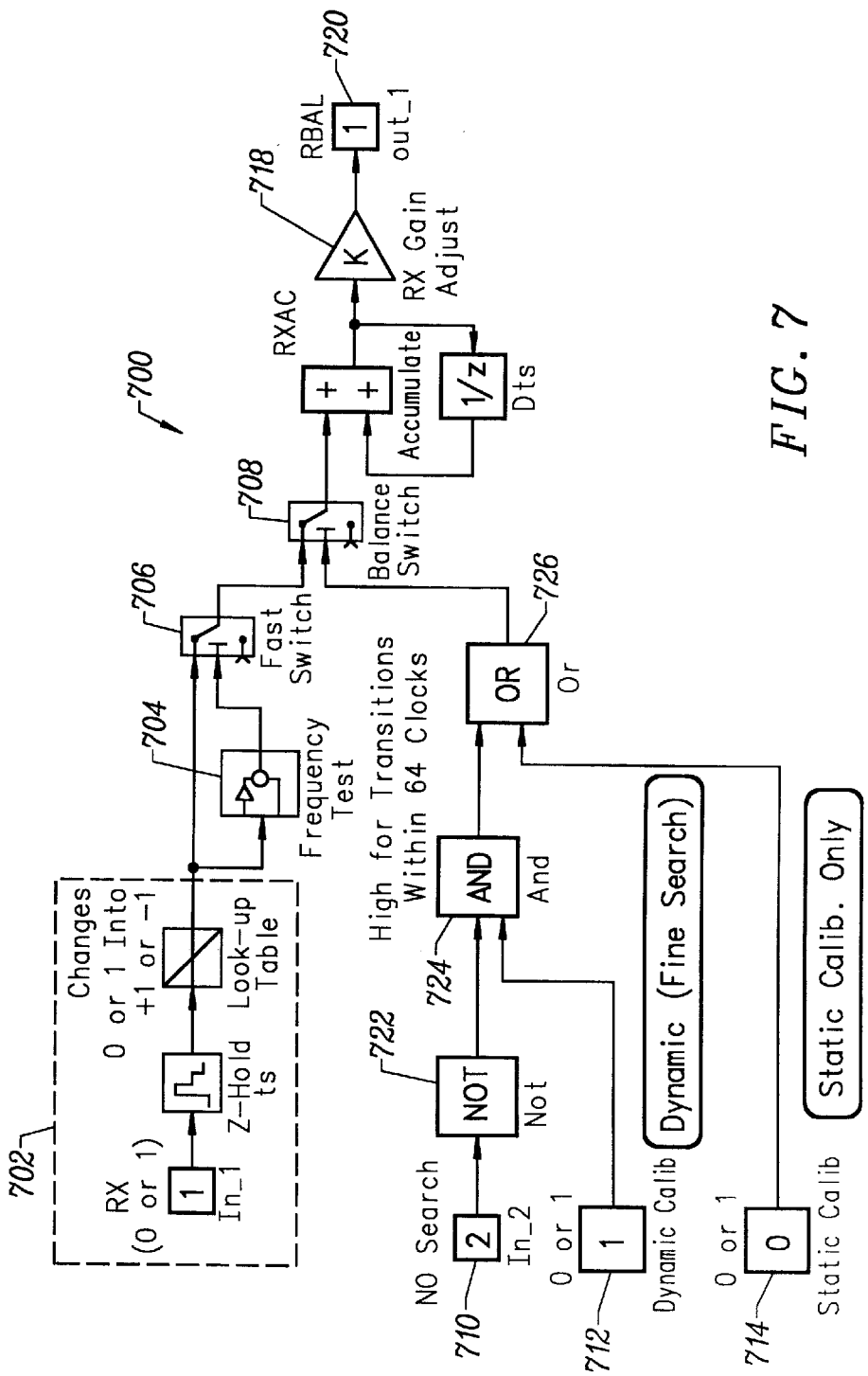
FIG. 7 is a diagram of a simulation of a system for dynamically adjusting disc-drive pickup signals in accordance with the invention.

FIG. 7 illustrates a simulation model utilizing dynamic adjustment of disc-drive pickup signals as described above. This model is based upon adjustment of the Ripple Balance Correction signal (RPBC) which, as shown in FIG. 5, is used to modify RFRP. This simulation specifies a dynamic "fine" search. In accordance with the discussion herein, a fine search may range from one to a few thousand tracks while a "rough" search may range from a few thousand to over twenty thousand tracks.

Select elements and operations of FIG. 7 are described in Table 2.

TABLE 2

| Element(s) | Operation |
| --- | --- |
| Block 702 | Converts an RX wave oscillating between 0 and 5 volts to a simulation signal oscillating between +1 and −1, respectively. |
| Frequency Test 704 Fast Switch 706 | Frequency Test 704 identifies low-speed stalls. If no RX transition is detected over 64 clock cycles, a stall is presumed and a fast switch 706 is tied low prohibiting further output. Alternatively, if transitions are occurring within the 64 cycle interval, fast switch 706 outputs plus or minus ones in accordance with the value of RX at a specified frequency (e.g., 352.8 kHz). |
| Balance Switch 708 No Search 710 Dynamic Calib 712 Static Calib 714 | A switch controlled by "NO Search" 710 (active low signal; search enabled when 0), "Dynamic Calib" 712 (signal controlled by a microprocessor (not shown) to enable dynamic adjustment) and "Static Calib" 714 (signal controlled by the microprocessor to enable static calibration). If the logical combination of these signals (as illustrated in FIG. 7) produces a logic one, Balance Switch 708 will allow output of Fast Switch 706 to pass to RXAC (RX accumulator) 716. Alternatively, if such logical combination produces a logic zero, Balance Switch 708 is tied low preventing output. |
| RXAC 716 | (RX Accumulator) When active, this block continues to sum positive or negative ones output by Fast Switch 706 (i.e., ±1) every clock cycle to produce a correction bias. |
| RX Gain Adjust 718 | Multiplier scaling function that converts the output of RXAC 716 to a value capable of being converted by a particular DAC to an appropriately proportional signal (e.g., RXAC may be converted into an eight-bit digital signal for conversion by an appropriate DAC). |
| Rbal 720 | Digital representation (signed integer number) of RPBC. Requires conversion by DAC to become RPBC (analog voltage). |
| Static Calib 714 | Provides for the generation of a static correction bias signal. As is well known, such signal is determined by placing a stationary optical pickup over a disc spinning at 1× rate (CD-ROM) thereby allowing the pickup to "cross" tracks due to runout. |

TABLE 2-continued

| Element(s) | Operation |
| --- | --- |
| Logic blocks 722–726 | Logic block 722 is a logic NOT (inverter), block 724 is a logic AND and block 726 is a logic OR. |

Figure 8A:
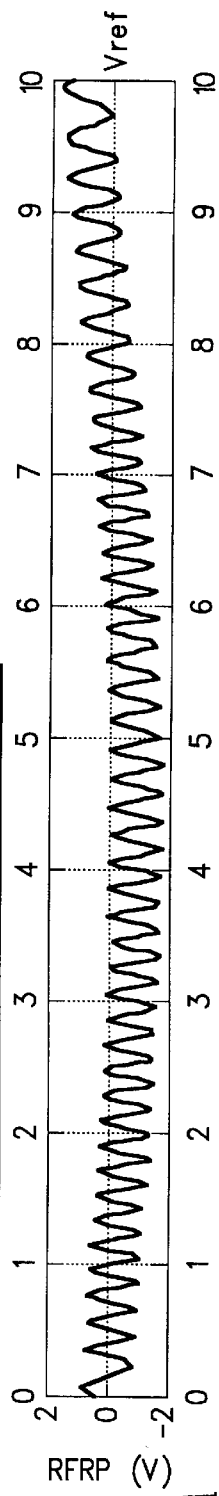
FIGS. 8A–8C are simulation results of the system of FIG. 7 when disc-drive pickup signals are not dynamically adjusted.
Figure 8B:
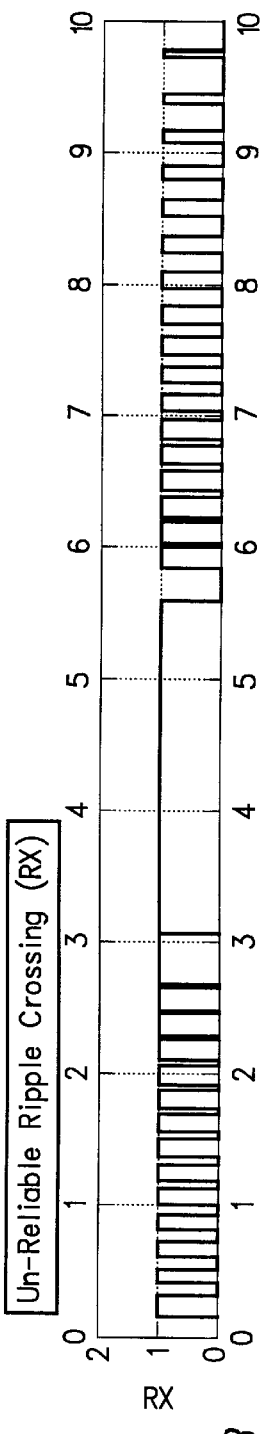
Figure 8C:
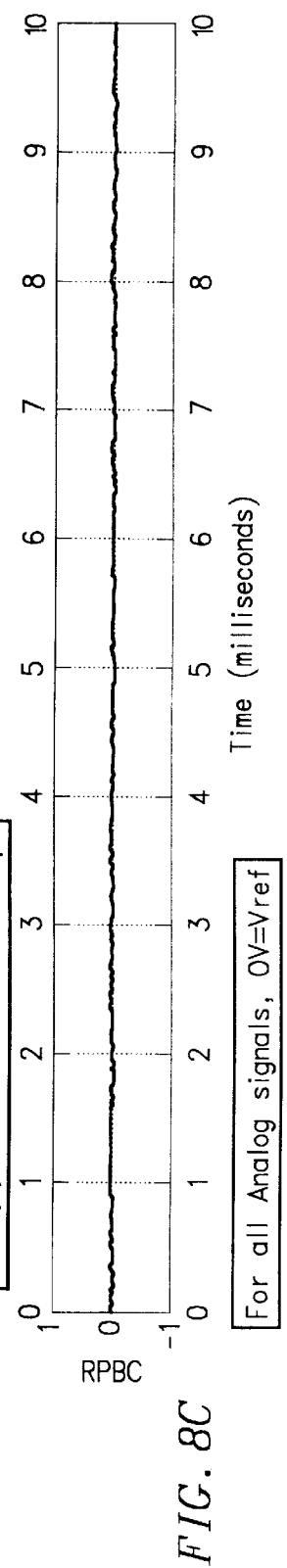

FIGS. 8A–8C illustrate a simulation (based on the model of FIG. 7) of a 32 track fine search without utilizing dynamic adjustment of disc-drive pickup signals as described above. As shown in FIG. 8A, RFRP falls below Vref (0 volts) from about 2.5 to about 5.5 milliseconds. As a result, RX (FIG. 8B) fails to oscillate over this same period, erroneously reporting no track crossings and theoretically losing its quadrature relationship with a corresponding TX signal (not shown).

Figure 9A:
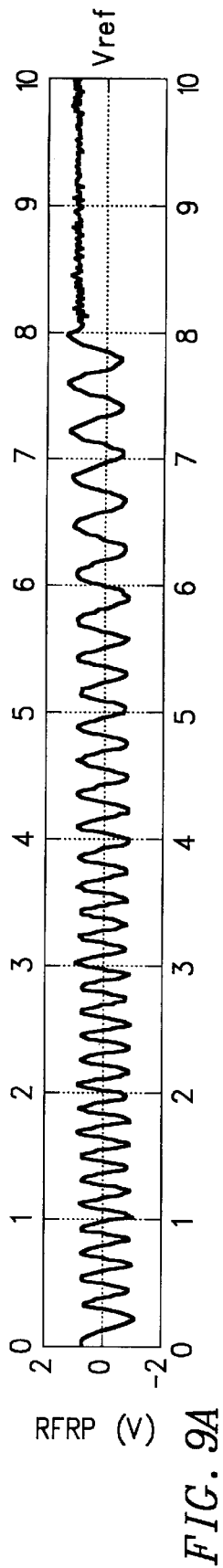
FIG. 9A–9C are simulation results of the system of FIG. 7 when disc-drive pickup signals are dynamically adjusted.
Figure 9B:
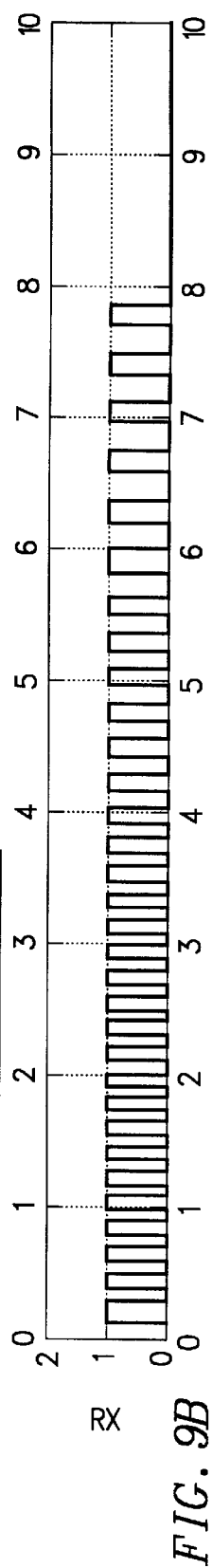
Figure 9C:
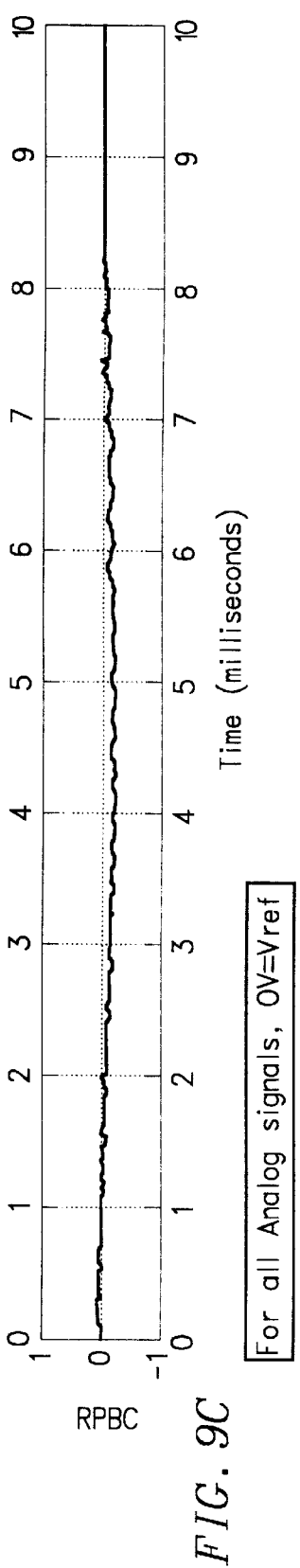

In contrast, FIGS. 9A–9C illustrate a simulation (based on the model of FIG. 7) of a 32 track fine search utilizing dynamic adjustment of disc-drive pickup signals as described above. As shown in FIG. 9A, RFRP now consistently maintains a relatively symmetric oscillation about Vref (0 volts) due to correction bias applied by RPBC (FIG. 9C). As a result, a relatively symmetric duty cycle is achieved and RX (FIG. 9B) accurately reports track crossings during the entire search.

Dynamic adjustment of disc-drive signals, as indicated above, may be-performed in systems utilizing sample clocks operating at a single, fixed frequency (e.g., "Sample_clk" fed to integrators 502, 552 in FIG. 5 and the fast switch 706 of system 700 in FIG. 7, both operating at about 352.8 kHz). Such static state can result in inaccuracies since track crossing speeds will fluctuate widely during the course of a search. For example, a pickup typically accelerates to a relatively high track-crossing speed at the start of a search. Moreover, this pickup will subsequently decelerate to a slower speed as it approaches the target track.

Accordingly, a high, fixed sampling frequency applied to a slow track crossing (e.g., following pickup deceleration) when the duty cycle is nonsymmetric can produce an exaggerated value that overcompensates for the nonsymmetry. Similarly, a low, fixed sampling frequency applied to a fast track crossing (e.g., following pickup acceleration) regardless of the duty cycle may fail to sample a significant portion of the duty cycle and thereby produce inaccurate values. In short, using a fixed sampling frequency in accordance with at least one embodiment of FIGS. 5 and 7 can produce a non-constant gain of the feedback loops during a search, resulting in overcorrecting or undercorrecting and ultimately leading to an unsuccessful search when the quadrature phase relationship (i.e., overlap of ideally 90°) between TX and RX is lost. This relationship (which may be less than 90°), is used to determine search direction and qualify track crossings.

More specifically, track crossing speeds (which control the frequency of pickup signals RFRP and TE) can vary from about zero (0) Hz to about 1000 Hz during "static calibration" (measuring and calibrating for disc runout at 1X CD-ROM rates, as is well known in the art) to over 120 kHz during a 12X search. Since the gain of the feedback loops in FIG. 5 depend on the integration rate (i.e., number of samples or counts made by integrators 502, 552), the sampling clock should also be made variable. Preferably, such sampling should be proportional to the track crossing speeds.

Figure 10:
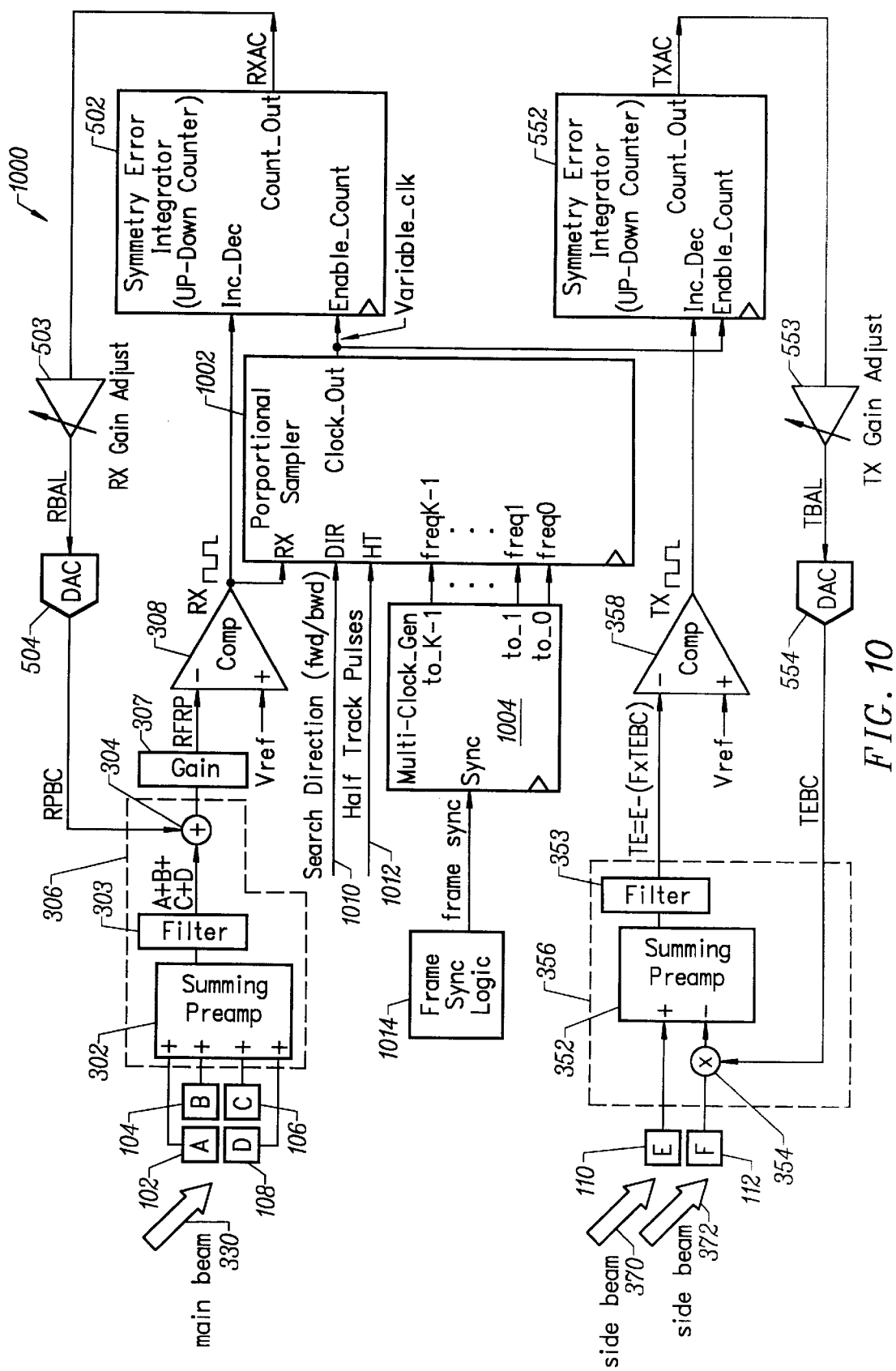
FIG. 10 is a block diagram of a system providing proportional sampling for dynamic adjustment of disc-drive pickup signals in accordance with the invention.

FIG. 10 illustrates a block diagram of a system 1000 (which is a modification of system 500 in FIG. 5 and may be used in preamp/servo circuit 25' of FIG. 4A) providing proportional sampling for dynamic adjustment of disc-drive pickup signals in accordance with a preferred embodiment of the invention. Such proportional sampling helps to achieve a more consistent gain and therefore provides a more accurate correction to pickup signals.

Referring to FIG. 10, system 1000 includes symmetry error integrator 502 coupled to RX Gain Adjust 503 which is, in turn, coupled to DAC 504. The output of DAC 504 is fed into summing junction 304. Moreover, junction 304 is part of circuit 306 which, as described above in connection with FIG. 5, receives input from photodiodes 102–108 and outputs an oscillating signal to comparator 308 through gain circuitry 307. These elements of system 1000 facilitate processing of signal RFRP to produce a signal RX having an approximately symmetric (i.e., 50—50) duty cycle.

System 1000 also includes a symmetry error integrator 552 coupled to TX Gain Adjust 553 which is, in turn, coupled to DAC 554. The output of DAC 554 is fed into multiplying junction 354. Junction 354 is part of circuit 356 which, as described above in connection with FIG. 5, receives input from photodiodes 110, 112 and outputs an oscillating signal to comparator 358. These elements of system 1000 facilitate the processing of signal TE to produce a signal TX having an approximately symmetric (i.e., 50—50) duty cycle.

System 1000 further includes proportional sampler 1002 which provides a variable sampling clock (also referred to as a "sampling strobe") to the "Enable_Count" inputs of integrators 502 and 552. Proportional sampler 1002 inputs signal RX from comparator 308, a search-direction signal "DIR" 1010 (described below), half-track pulses 1012 (described below) and a number of clock signals (i.e., "K") at varying frequencies. These clock signals are generated by a multi-clock generator 1004 which is synchronized with a disc drive system clock through the use of a conventional frame sync signal generated by "frame sync" logic 1014.

Frame sync logic 1014 is a conventional circuit that periodically generates a pulse to synchronize multi-clock generator 1004 with a disc-drive system clock. In a preferred embodiment, this synchronization pulse operates at a frequency of about 352 kHz and the system clock at about 33 MHZ.

In a preferred embodiment, integrators 502 and 552 are simply up-down counters with no underflow and no overflow. If counting up, these integrators are not allowed to count beyond their highest positive number and if counting down, beyond their lowest negative number. As described in FIG. 5 above, the direction of count for integrators 502 and 552 are controlled by the value of the RX and TX quadrature signals, respectively. A variable frequency clock generated by sampler 1002 and adjusted to be much higher than the frequency of track-crossing provides the sampling strobe (which enables counting operations) for each integrator 502, 552.

Multi-clock generator 1004 is a conventional clock divider module generating a discrete number of different frequency strobes. In a prototype of system 1000, strobes operating-at eight frequencies from about 22 kHz to about 2.8 MHZ in multiples of two were used (i.e., 22 kHz, 44 kHz, 88 kHz, etc., up to 2.8 MHZ). However, as would be understood by one having ordinary skill in the art, any number of frequencies and any ratio between adjacent frequencies can be used.

Proportional sampler 1002 provides a sampling strobe to integrators 502, 552 at a frequency proportional to track-crossing speed. Such variable frequency stabilizes the integration rate of integrators 502, 552 by keeping the number of sample pulses per track crossing (and therefore the number of counts performed by integrators 502, 552) within a window defined by ratios of frequencies between adjacent strobe inputs of multi-clock generator 1004. As described below, proportional sampler 1002 uses half-track pulses and a search-direction signal to determine the boundary for one full-track crossing. For any particular track-crossing speed, sampler 1002 will generate a strobe that toggles between a higher frequency that takes more than "M" samples during a full-track crossing and the next lower (i.e., adjacent) frequency that takes less than "M" samples during such full-track crossing. The value "M" represents the desired number of samples (or counts) per track crossing. Each "sample" results in a count generated by integrators 502, 552 in the form of an increment or decrement as directed by the values of signals RX and TX, respectively.

Multi-clock generator 1004 automatically provides for two new "adjacent" frequencies when a new clock frequency is selected except for the first frequency (i.e., freq0) which has no adjacent lower frequency and the Kth frequency (i.e., freqK-1) which has no adjacent higher frequency Should these extreme frequencies be selected, generator 1004 will simply re-assert the currently-selected frequency as a lower or higher "adjacent" frequency for the first and Kth frequencies, respectively.

Changes in sampling strobe frequency occur on a full-track boundary. A preferred method for changing frequencies is shown in a flow chart 1100 in FIG. 11. The variables used in this flow chart are defined in Table 3 below.

TABLE 3

| Variable | Definition |
| --- | --- |
| K | Number of monotonically increasing frequencies from $F_0$ to $F_{K-1}$ |
| $F_N$ | Present integrator sampling frequency |
| $F_{TX}$ | Track crossing frequency |
| M | Desired number of samples per track crossing |
| $R_{AF}$ | $F_{N+1}/F_N$, the adjacent frequency ratio |

Figure 11:
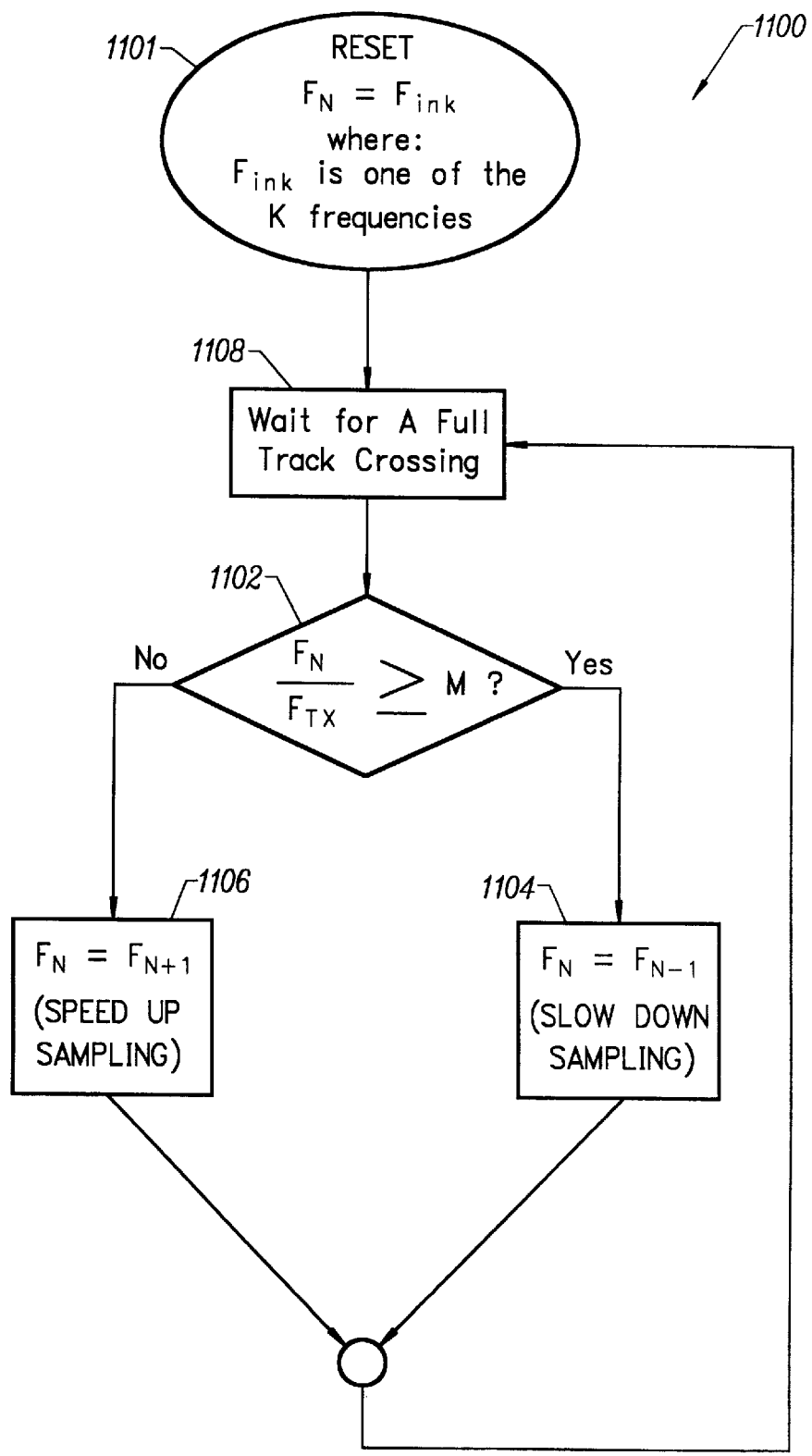
FIG. 11 is a flow chart illustrating operation of a proportional sampler disposed within the system of FIG. 10.

Referring to FIG. 11, proportional sampler 1002 provides a sampling strobe to integrators 502, 552 during a track search operation (as well as other operations including static calibration). The frequency of this strobe is represented by variable $F_N$ in flow chart 1100.

Pursuant to block 1101, a sampling frequency is selected from one of the "K" frequencies available from multi-clock generator 1004 to serve as the initial value for $F_N$ in the present search. This selection is preferably carried out by simple reliance on a pre-set default value hard wired into the circuit. Alternatively, the initial value may be specifically chosen based upon some predictive criteria, such as the last value used in the immediately prior search.

After a first full track is crossed pursuant to block 1108, a track crossing frequency represented by variable $F_{TX}$ is determined (based upon the time required to complete the crossing) and the threshold condition of "$F_N/F_{TX} \geq M$" is tested pursuant to block 1102. Significantly, the ratio $F_N/F_{TX}$ need not be computed to perform this threshold test. Rather, the generation or non-generation of a terminal count signal (TC) by a counter 1204 (FIG. 12) within a specified period based upon real-time signals, as described below, resolves the threshold test of block 1102.

If the sampling strobe is operating at too high a frequency (this upper limit being conceptually defined by the ratio of block 1102 being greater than or equal to M), a next lower frequency ($F_{N-1}$) is selected by sampler 1002 in accordance with block 1104. Conversely if the sampling strobe is operating at too low a frequency (this lower limit being conceptually defined by the ratio of block 1102 being less than M), a next higher frequency ($F_{N-31\ 1}$) is selected from generator 1004 to speed up the sampling in accordance with block 1106. This new sampling frequency is utilized by sampler 1002 until the next full track crossing is complete pursuant to block 1108. At such time, control returns to block 1102 to repeat the foregoing operation.

As an alternative embodiment, sampler 1002 may increment or decrement the sampling frequency a greater amount than simply the next highest or next lowest frequency provided by multi-clock generator 1004. In such an embodiment, the change in frequency would be dependent upon the size of the difference between M and the ratio $F_N/F_{TX}$.

As described above, sampler 1002 either increments or decrements the sampling frequency at the end of each track crossing cycle (i.e., a full-track crossing). In yet another embodiment, 1002 may simply retain the current sampling frequency when $F_N/F_{TX}$ equals M. But, like the method described in flow chart 1100, this alternative would also increment the sampling frequency if $F_N/F_{TX}$ is less than M and decrement this frequency if $F_N/F_{TX}$ is greater than M. As described above, the ratio $F_N/F_{TX}$ need not be computed; rather, relative sampling rate is determined by monitoring real-time signals as described below.

Upon reaching a destination track in a track search, integrators 502, 552 are disabled by a control signal from a microprocessor or some other control circuitry (not shown). Accordingly, the value $F_N$ remains unchanged until the start of the next search, when the squence of FIG. 11 begins again starting at block 1101. Similarly, when performing static calibration, integrators 502, 552 are disabled when an approximate 50— 50 duty cycle is reached for signals RFRP and TE. At the start of a subsequent search, the sequence of FIG. 11 begins again starting at block 1101.

Figure 12:
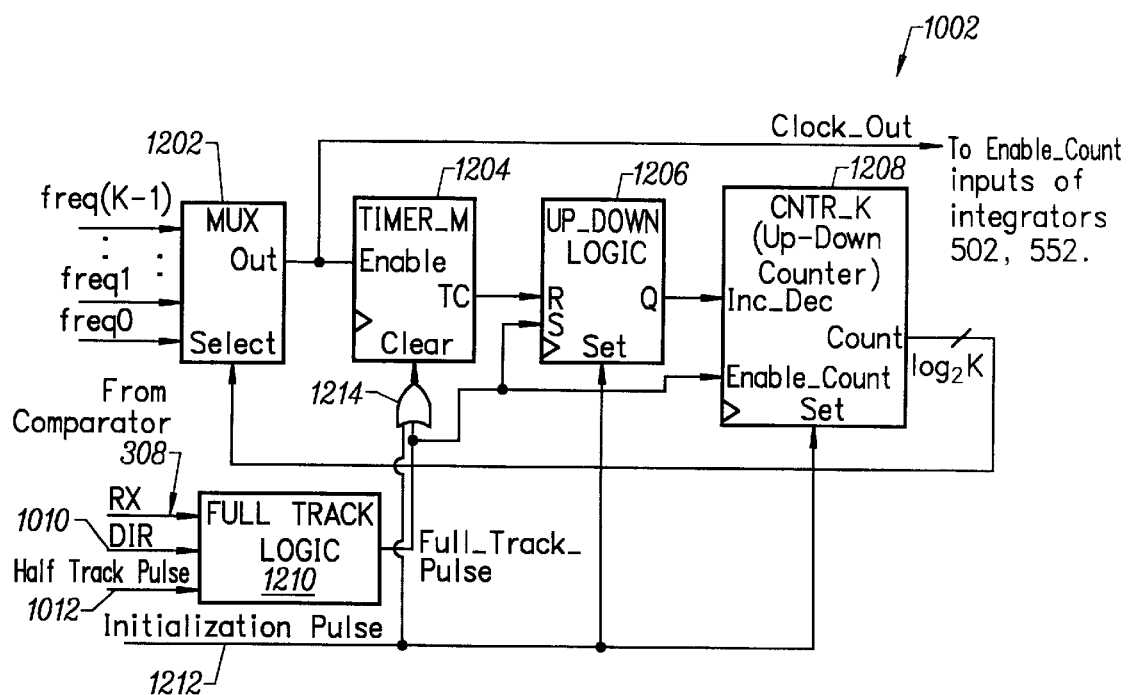
FIG. 12 is a block diagram of the proportional sampler disposed within the system of FIG. 10.

FIG. 12 illustrates a block diagram of proportional sampler 1002. Referring to FIG. 12, sampler 1002 includes a multiplexer 1202 which receives the various clock signals from multi-clock generator 1004 and selects one of these as an output to integrators 502 and 552 (FIG. 10). Multiplexer 1202 is coupled to timer 1204 which is, in turn, coupled to up-down logic 1206 whose output is coupled to up-down counter 1208. The output of counter 1208 (a selection signal used to control multiplexer 1202) is returned to the select input of multiplexer 1202. Sampler 1002 also includes full-track logic 1210 which receives the RX signal and search-direction signal ("DIR") 1010 as well as half-track pulses 1212. The output of logic 1210 is coupled to timer 1204 (clear input) through OR gate 1214, logic 1206 (S input) and counter 1208 (Enable_Count input). Finally an initialization pulse 1212 controlled by a microprocessor (not shown) is coupled to timer 1204 (clear input) through OR gate 1214, logic 1206 (set input) and counter 1208 (set input).

In the embodiment of FIG. 12, multiplexer 1202 selects one of K clock signals wherein each signal is operating at a different frequency. Selection is carried out by counter 1208 having K counts. This counter is designed to clip when there is an overflow or an underflow. In a prototype of this embodiment, the target number of samples per track crossing was 32 (i.e., M=32) and the number of strobe frequencies was 8 (i.e., K=8).

Timer 1204 is a conventional modulo M binary counter that generates a terminal count ("TC") when the count value reaches all ones (i.e., a full count or "M"). Each count is enabled by the sampling strobe output by multiplexer 1202 (i.e., Timer 1204 increments by 1 at each strobe pulse).

Figure 13A:
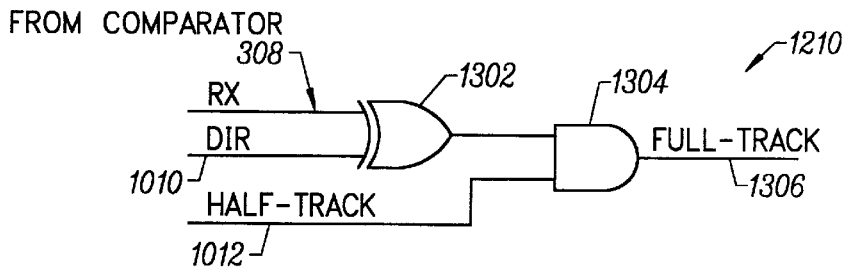
FIGS. 13A and 13B are diagrams illustrating composition and operation of full-track logic disposed within the proportional sampler of FIG. 12.
Figure 13B:
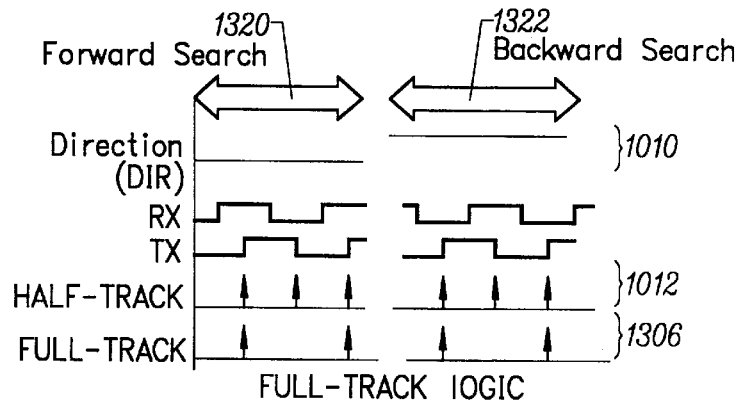

Full-track logic 1210 generates a full-track pulse (representing a full-track crossing) from half-track pulses 1012, RX signal from comparator 308 and DIR signal 1010 as shown in FIGS. 13A and 13B. Referring to FIG. 13B, half-track pulses 1012 are generated at each transition of the TX signal. Conventional logic may be used to generate these pulses such as edge-triggered circuits functioning like one-shots (e.g., one circuit triggered in a low-to-high TX transition and another triggered in a high-to-low TX transition) ORed together so that pulses are generated at each TX transition. Variations to this circuit and construction of other appropriate circuits would be apparent to those having ordinary skill in the art.

Referring again to FIG. 13B, DIR signal 1010 is determined by the relative order of RX and TX signals. As shown in this figure, DIR is a logic 0 representing a forward search (illustrated by forward-search arrow 1320) when signal RX leads signal TX (ideally by 90°). Conversely signal DIR is a logic 1 representing a backward search (illustrated by backward-search arrow 1322) when RX lags signal TX (again, ideally by 90°). The logic necessary to create signal DIR based upon signals RX and TX is conventional and well known to those having ordinary skill in the art. For example, a conventional state machine may be constructed that generates a logic 0 for DIR (representing a forward search) if RX is a logic 1 when TX transitions from logic 0 to 1. Alternatively, this state machine would generate a logic 1 for DIR (representing a backward search) if RX is a logic 0 when TX transitions from logic 0 to 1.

Referring again to FIGS. 13A and 13B, a full-track pulse 1306 is generated at the positive edge of signal TX. As is well known in the art, there are numerous ways of constructing an edge detector. This particular way was chosen because the half-track pulses are glitch free and already generated for other purposes. Referring again to FIG. 13A, full-track logic 1210 includes exclusive OR gate 1302 (which inputs signals RX and DIR 1010) coupled to AND gate 1304 (which inputs half-track pulses 1012 and the output of gate 1302). Full-track pulses 1306 are output from AND gate 1304.

As the foregoing illustrates, the purpose of signal DIR is for marking the full-track boundaries so that sampling speeds may change on a fresh cycle (e.g., upon completing each traversal of a track). The inclusion of signal DIR, however, is not critical. As would be apparent to one having ordinary skill in the art, other signals and methods could be used to identify full-track boundaries. If signal DIR is not used, it is possible that one cycle of TX or RX, during runout (i.e., off-centered disc rotation), in the transition from moving forwards to moving backwards will be sampled by two frequencies creating a perturbation. But subsequent cycles will correct that perturbation. Since the number of track crossings occurring during a direction change is typically very small, the net result is a possible delay (or possible acceleration) in the final settling of a correction bias loop (e.g., system 501 or 550).

However, it is preferred to use signal DIR since it provides a clean switchover in sampling speeds per track crossing. In summary, although signal DIR is not necessary to carrying out dynamic adjustment of pickup signals and proportional sampling in accordance with the present invention, it is desirable. (Conversely, DIR is of considerable importance in determining the number of tracks to move across during a search with a disc that experiences runout.)

Figure 14A:
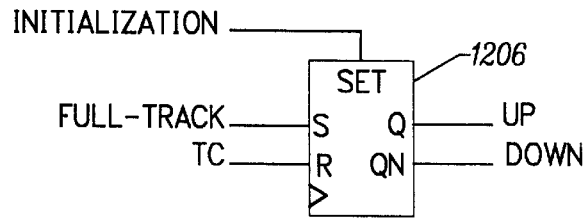
FIGS. 14A and 14B are diagrams illustrating composition and operation of up-down logic disposed within the proportional sampler of FIG. 12.
Figure 14B:
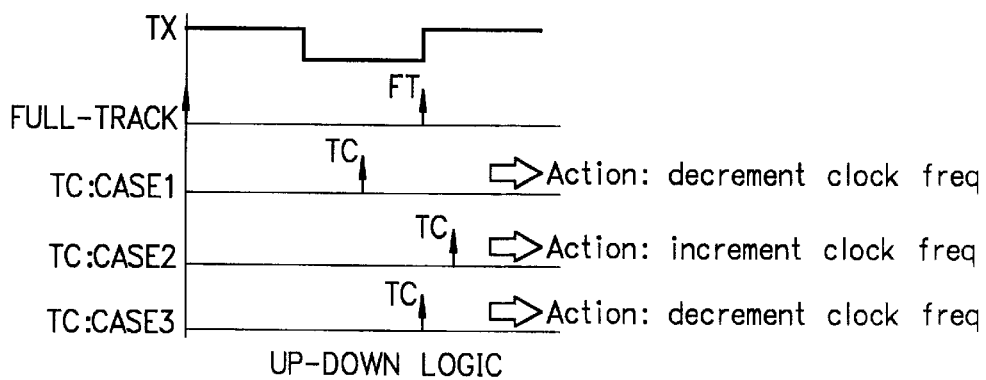

Referring again to FIG. 12, logic 1206 may be constructed from an RS flip-flop or similar structure. Logic 1206 is used to increment or decrement counter 1208. The operational timing of logic 1206, as described below, is illustrated graphically in FIG. 14B. Referring to FIGS. 12, 14A and 14B, a full-track pulse issued from logic 1210 resets the timer 1204. If the next full-track pulse is generated before timer 1204 issues a TC, this implies the sampling clock is slow and therefore logic 1206 outputs a logic 1 directing counter 1208 to increment its count. As a result, the output of counter 1208 selects the next higher frequency available at multiplexer 1202. However, if TC is generated before or at the same time as a new full-track pulse (i.e., M or more samples were taken during the period), logic 1206 is reset and outputs a logic 0 which directs counter 1208 to decrement at the next full-track boundary thereby selecting the next lower frequency available at multiplexer 1202.

The foregoing timing is illustrated in FIG. 14B. In a preferred embodiment, logic 1206 is an RS flip-flop defined to reset when R and S arrive at the same time. In the embodiment of FIG. 12, the single Q output of logic 1206 is utilized to direct counter 1208. Alternatively, as shown in FIG. 14A, both Q and Q complement ("QN") outputs may be utilized to indicate an increment or decrement, respectively, in clock frequency.

Referring again to FIG. 12, up-down counter 1208 operates (i.e., counts) at full-track boundaries. Upon receipt of a full-track pulse from logic 1210, counter 1208 will increment or decrement by 1 based upon the value placed at its "Inc_Dec" input by logic 1206. A logic 0 at this input will cause counter 1208 to decrement and a logic 1 will cause this counter to increment.

Accordingly, determination of the next sampling frequency ($F_N$) is based upon the processing of real-time signals including a full-track pulse (FT) and terminal count (TC). No computation of the ratio $F_N/F_{TX}$ (described above in connection with FIG. 11) is necessary. As such, the system of FIG. 10 may be constructed from relatively simple hardware including counters without the need for microprocessor-type capability to perform resource-demanding arithmetic calculations (e.g., the calculation of $F_N/F_{TX}$). Such embodiment avoids the cost and complexity of microprocessor-based designs as well as potential limitations in processing bandwidth (compared with simple counters).

Referring again to FIG. 12, an initialization pulse 1212 is conveyed to the set inputs of both logic 1206 and counter 1208, and the clear input of timer 1204 through OR gate 1214. The initialization pulse resets timer 1204, sets up-down logic 1206 and sets counter 1208 thereby initializing the beginning frequency at the start of a search or static calibration operation. Initialization pulse 1212 is triggered by the start of such operations through a conventional microprocessor or standard hardware power-on reset circuitry.

In general, the systems of FIGS. 5 and 10 utilize relatively simple components and therefore demand less silicon when fabricated than computation-intensive components, such as microprocessors. Moreover, in accordance with the present invention, sampling frequency ($F_N$) slows down as needed to keep samples relatively constant for each track crossing. Accordingly, enabling hardware such as timer 1204 may be kept relatively small in accordance with the relatively constant sample rate to minimize even further the amount of silicon required to fabricate the system of FIG. 10 on a semiconductor chip.

Figure 15B:
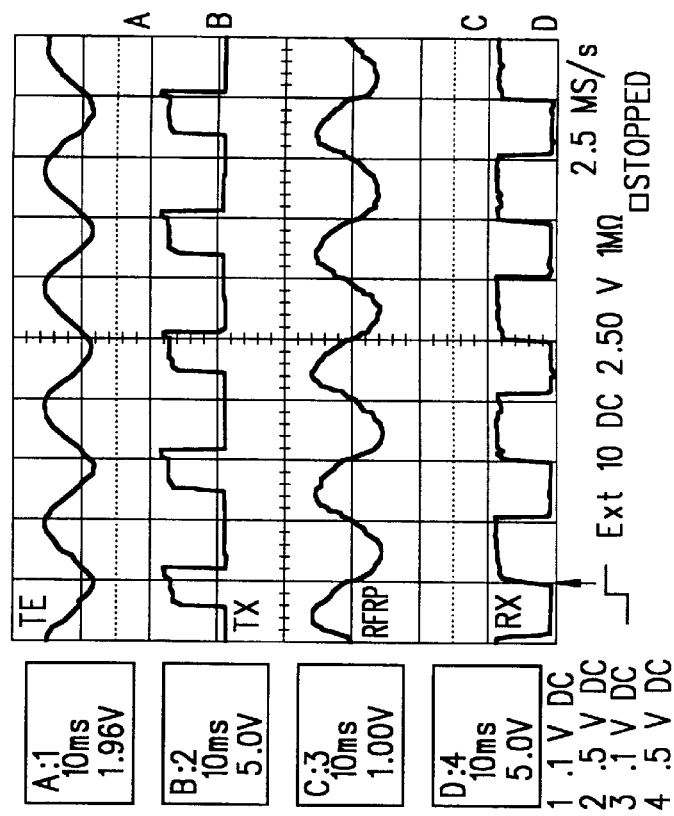
FIGS. 15A and 15B illustrate performance results of the system of FIG. 10 in a 2047 Track Fine Search with Wobble Disc without proportional sampling and dynamic adjustment of disc-drive pickup signals.
Figure 15A:
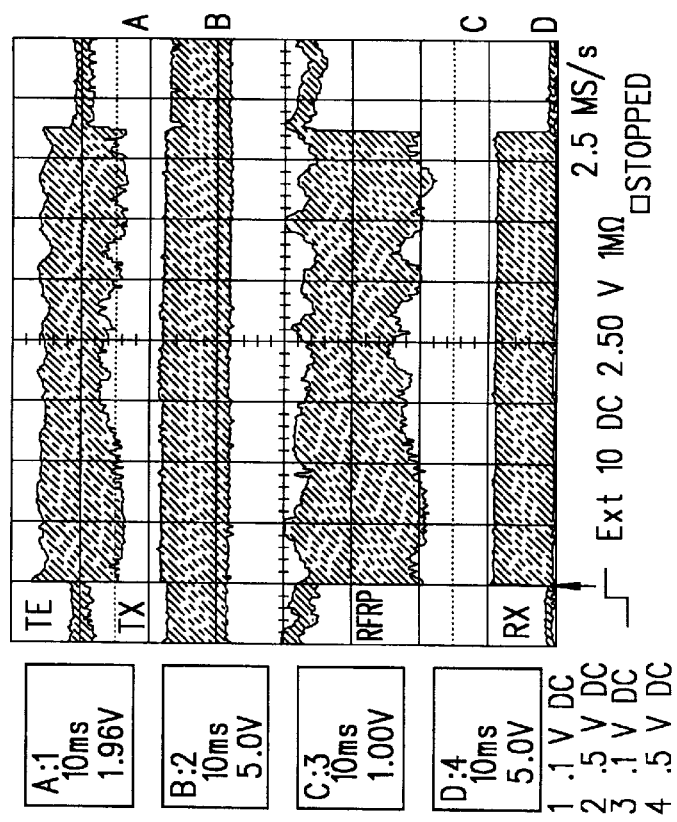

FIGS. 15A and 15B illustrate performance results of System 1000 in a 2047-track fine search using a "Wobble Disk" (i.e., an optical disc having an intentional, vertical deformation used for testing purposes) without proportional sampling and dynamic adjustment of disc-drive pickup signals. On this occasion, this particular drive successfully completed its search, although signals TX and RX were very close to losing their quadrature overlap (FIG. 15B). Should this overlap be lost, it would not be possible to determine direction of some portions of the subject search, resulting in a track miscount.

Figure 16B:
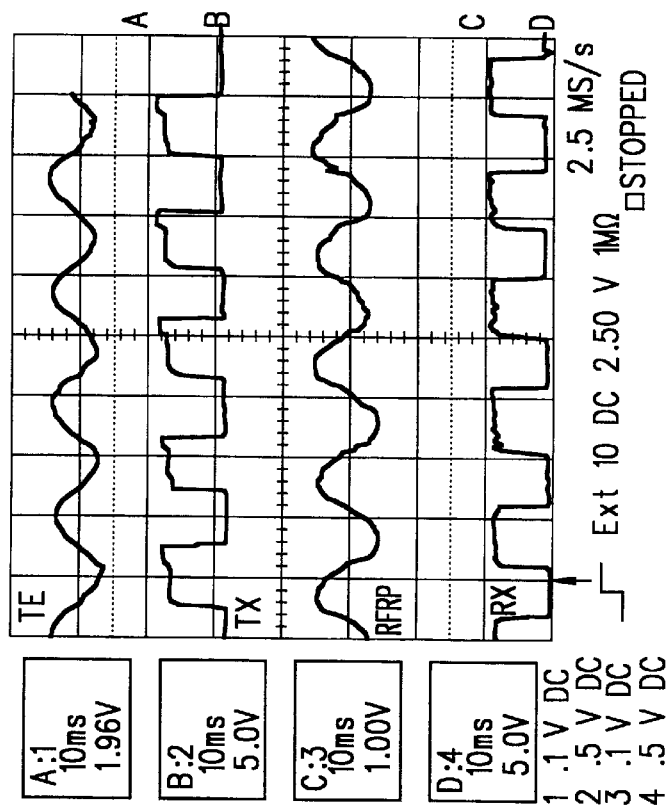
FIGS. 16A and 16B illustrate performance results of the system of FIG. 10 in a 2047 Track Fine Search with Wobble Disc with proportional sampling and dynamic adjustment of disc-drive pickup signals.
Figure 16A:
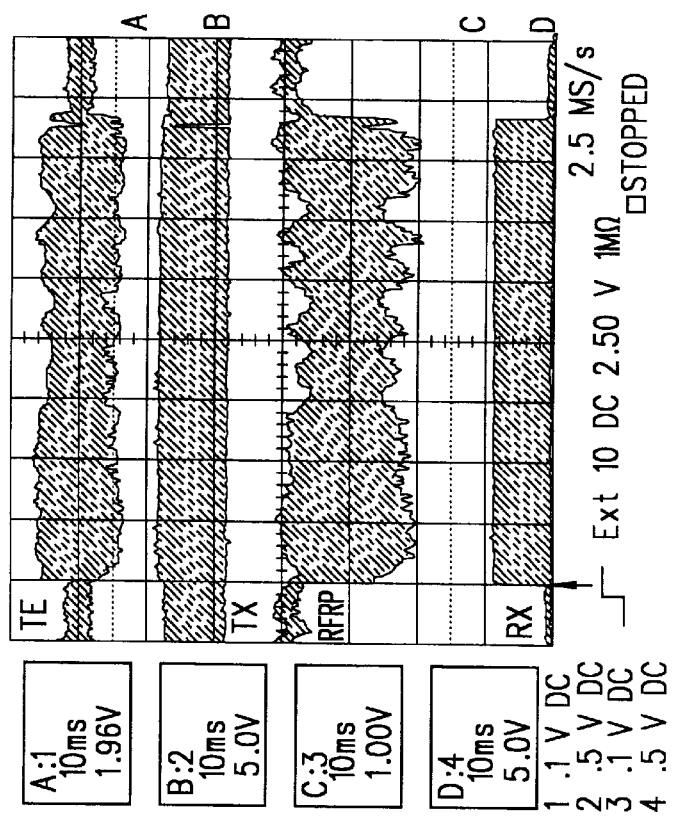

FIGS. 16A and 16B illustrate performance results of system 1000 in a 2047-track fine search using the Wobble Disk with proportional sampling and dynamic adjustment of disc-drive pickup signals in accordance with the present invention. With dynamic adjustment being applied, signals TX and RX moved closer to the ideal 50—50 duty cycle and the quadrature overlap was increased. In the prototype drive which generated these signals, TE and RFRP were not exactly 90° out of phase which explains why signals TX and RX did not have a 90° overlap even though they were near perfect square waves.

Figure 17:
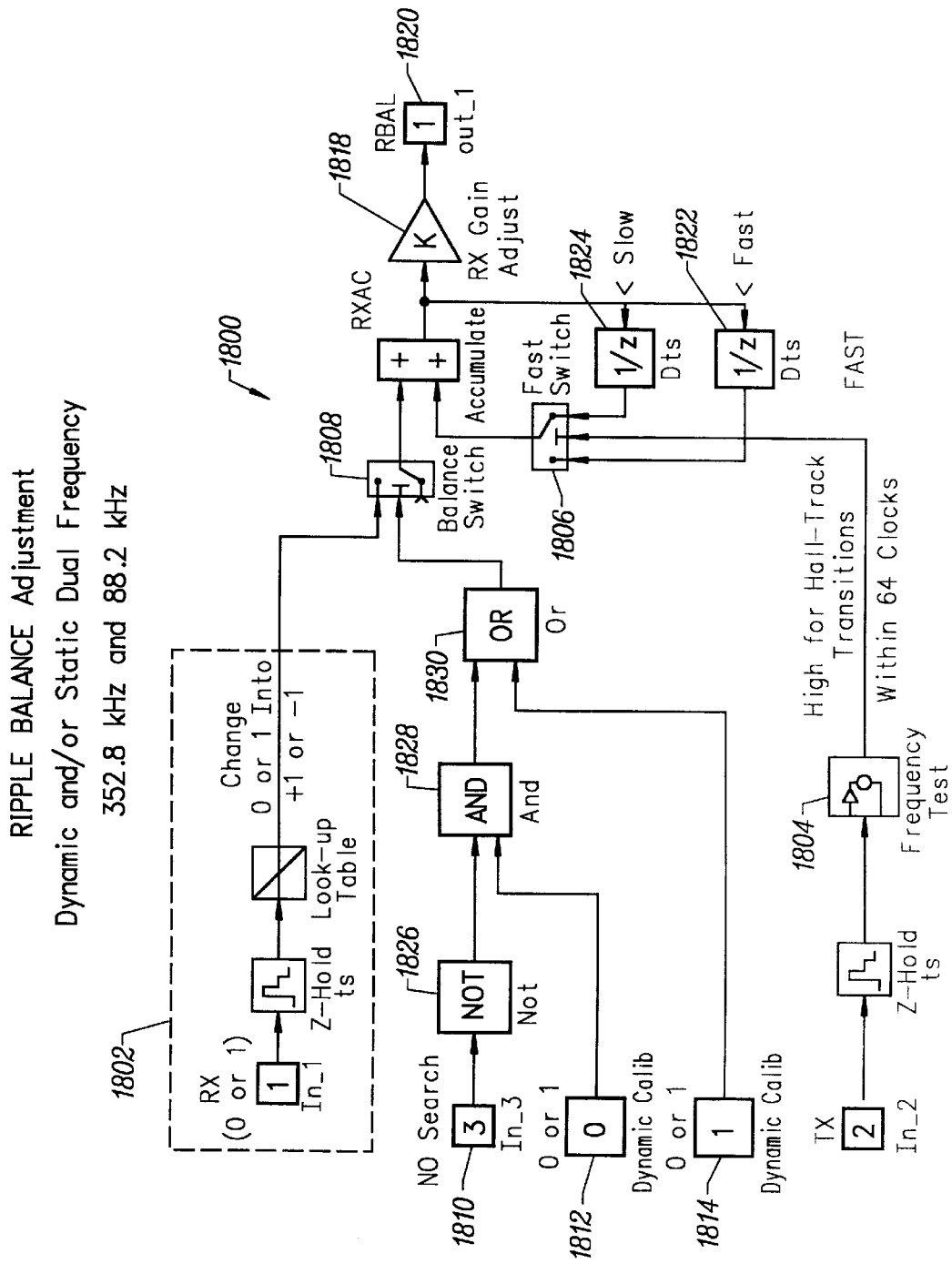
FIG. 17 is a diagram of a simulation of a system with two-speed sampling for dynamic adjustment of disc-drive pickup signals in accordance with an alternative embodiment of the invention.

FIG. 17 illustrates a simulation model of an alternative embodiment of the present invention. In this model, two-speed sampling is provided for dynamic adjustment of disc-drive pickup signals. In this case, variable sampling is controlled exclusively by the frequency of signal TX. Select elements and operations of FIG. 17 are described in Table 4 below.

TABLE 4

| Element | Operation |
| --- | --- |
| Block 1802 | Converts an RX wave oscillating between 0 and 5 volts to a simulation signal oscillating between +1 and −1, respectively. |
| Balance switch 1808 No Search 1810 Dynamic Calib 1812 Static Calib 1814 | A switch controlled by "No Search" 1810 (active low signal; search enabled when 0), "Dynamic Calib" 1812 (signal controlled by a microprocessor (not shown) to enable dynamic adjustment) and "Static Calib" 1814 (signal controlled by the microprocessor to enable static calibration). If the logical combination of these signals (as illustrated in FIG. 17) produces a logic 1, balance switch 1808 will allow output of block 1802 to pass to RXAC 1816 (RX accumulator). Alternatively, if such combination produces a logic 0, balance switch 1808 is tied low preventing such output. |
| Accumulation Blocks 1822, 1824 | Block 1822 allows accumulation of a ±1 value generated by block 1802 to occur every clock cycle. Block 1824 allows accumulation of such ±1 value to occur only once every four clock cycles. |
| Frequency test 1804 Fast switch 1806 | Frequency Test 1804 identifies low-speed track crossing based on signal TX. If no TX transition is detected over 64 clock cycles, a fast switch 1806 is tied to a slow accumulation block 1824 which slows RXAC 1816 operation to one quarter its normal rate (i.e., an accumulation occurs once every four clock cycles). This enables a gradual modification to the RPBC signal during slow speed and/or stalls. Alternatively, if TX transitions are occurring within the 64 cycle interval, |

TABLE 4-continued

| Element | Operation |
| --- | --- |
| | fast switch 1806 selects accumulation block 1822 which allows accumulations to occur at every clock cycle. Fast Switch 1806 outputs accumulated values at a maximum system frequency if accumulation block 1822 is selected and at one-quarter this rate if accumulation block 1824 is selected. |
| RXAC 1816 | (RX accumulator) When active, this block continues to sum positive or negative ones (as output by block 1802) at frequencies defined by accumulation blocks 1824 and 1822 to produce a correction bias. |
| RX Gain Adjust 1818 | Multiplier scaling function that converts the output of RXAC 1816 to a value capable of being converted by a particular DAC to an appropriately proportional signal. |
| RBAL 1820 | Digital representation (signed integer number) of RPBC. Requires conversion by DAC to become RPBC (analog voltage). |
| Static calib 1814 | Same definition as in Table 2. |
| Logic Blocks 1826–1830 | Logic block 1826 is a logic NOT (inverter), block 1828 is a logic AND and block 1830 is a logic OR. |

Figure 18A:
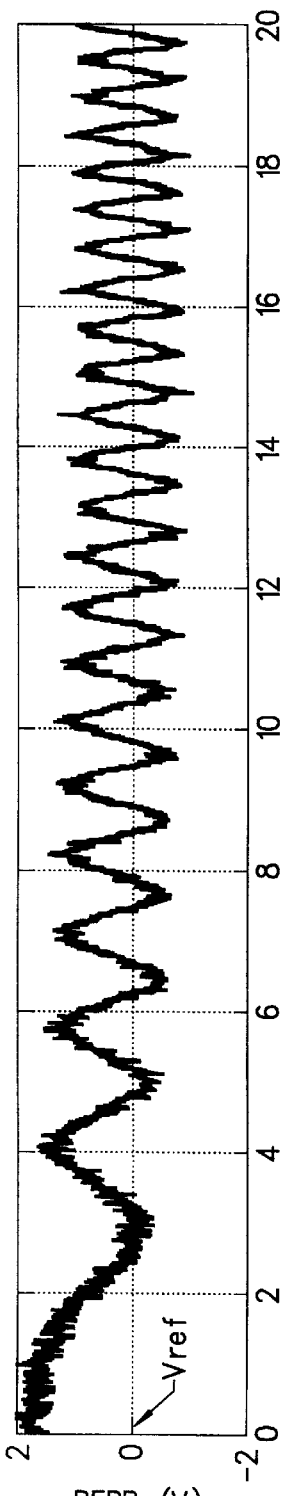
FIGS. 18A–18C are simulation results of the system of FIG. 17 illustrating dynamic adjustment of disc-drive pickup signals.
Figure 18B:
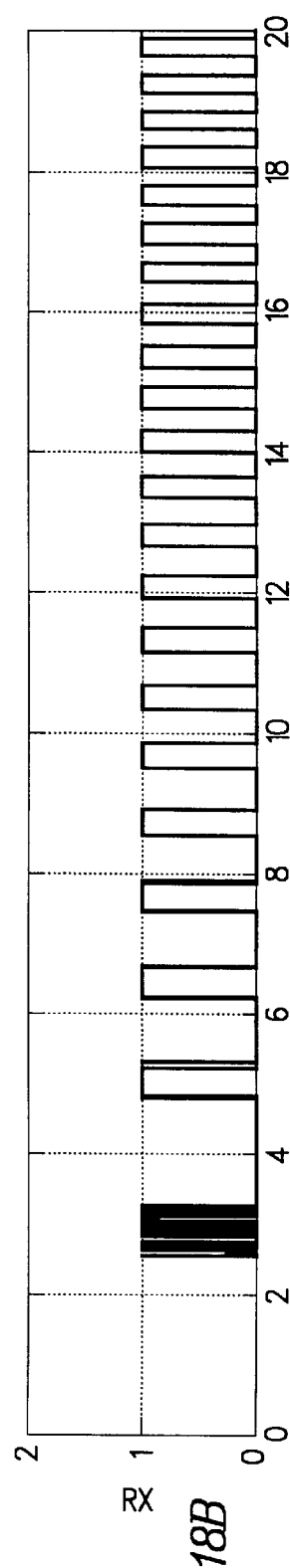
Figure 18C:
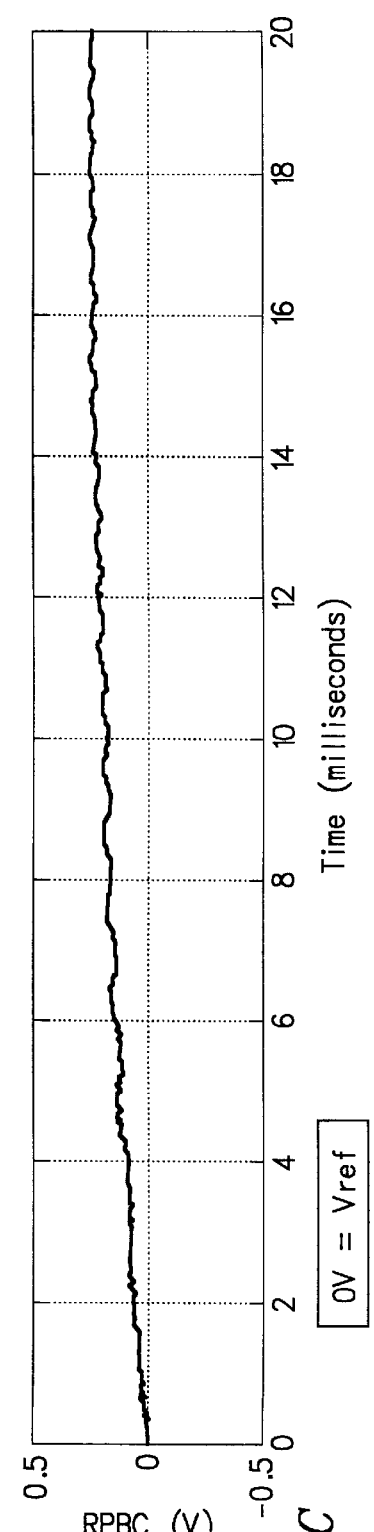

FIGS. 18A through 18C illustrate a simulation (based on the model of FIG. 17) of a disc-drive static calibration (i.e., 1X rotation with stationary pickup) utilizing two-speed sampling for dynamic adjustment of disc-drive pickup signals. As shown in FIG. 18A, region 1902 is just barely in range (i.e., oscillating slightly under $V_{ref}$ set at 0 volts). Accordingly, pursuant to the simulation of FIG. 17, signal RPBC (FIG. 18C) is gradually increased under the control of RX (FIG. 18B) to compensate for the RFRP signal which is initially just barely in range.

This gradual modification occurs at a rate defined by TX, which may be one-quarter of the standard rate or the full rate depending upon the frequency of TX transitions, as described in Table 4. Once RFRP is sufficiently biased to achieve a relatively symmetric duty cycle, signal RPBC will continue to be adjusted dynamically, as described above, to maintain this relationship. The sampling (or accumulation) frequency of RXAC 1816 will be determined by TX.

While the foregoing is a complete description of the embodiments of the invention, various modifications, alternatives and equivalents may be used. Accordingly, the above description should not be taken as limiting the scope of the invention which is defined by the appended claims.

What is claimed is:

1. A disc drive system including a disc containing a plurality of tracks, the disc drive system comprising:

a first plurality of sensors generating output which is combined to form a first signal oscillating in response to movement across one or more of said plurality of tracks;

a first low pass filter that receives said first signal and removes high frequency components, said first filter introducing a phase shift to said first signal;

a second plurality of sensors generating output which is combined to form a second signal oscillating in response to movement across one or more of said plurality of tracks;

a second low pass filter that receives said second signal and removes high frequency components, said second filter introducing said phase shift to said second signal, said first and second filters have approximately identical cut-off frequencies, and a gain circuit coupled to said second filter which inverts the filtered second signal and adjusts peak-to-peak amplitude.

2. The disc drive system of claim 1 wherein said low pass filters have cut-off frequencies are approximately 60 kHz.

3. The disc drive system of claim 1 wherein said first and second filters are second order.

4. The disc drive system of claim 1 wherein said first and second signals are in quadrature.

5. A disc drive system including a disc containing a plurality of tracks, the disc drive system comprising:

a first plurality of sensors each generating a first output;

a summing circuit, coupled to said first plurality of sensors, for combining the first output of said first plurality of sensors into a first oscillating signal;

a first low pass filter, coupled to said summing circuit, that introduces a phase shift into said first oscillating signal;

a second plurality of sensors each generating a second output;

a difference circuit, coupled to said second plurality of sensors, for combining the second output of said second plurality of sensors into a second oscillating signal;

a second low pass filter, coupled to said difference circuit, that introduces said phase shift into said second oscillating signal, said first and second filters having approximately identical cut-off frequencies, and a gain circuit coupled to said second filter which inverts the filtered second signal and adjusts peak-to-peak amplitude.

6. The disc drive system of claim 5 wherein said first and second filters are second order.

7. The disc drive system of claim 6 further comprising a gain circuit coupled to said first filter.

* * * * *